US012656768B2

(12) United States Patent
Wang et al.

(10) Patent No.:  US 12,656,768 B2
(45) Date of Patent:     Jun. 16, 2026

(54) DATA PROCESSING METHOD, AND ELECTRONIC DEVICE AND STORAGE MEDIUM FOR DETERMINING AN INFLUENCE DEGREE OF PROCESS INFORMATION ON A SUDDEN DEFECT

(71) Applicants: Beijing Zhongxiangying Technology Co., Ltd., Beijing (CN); BOE TECHNOLOGY GROUP CO., LTD., Beijing (CN)

(72) Inventors: Yu Wang, Beijing (CN); Haijin Wang, Beijing (CN); Wangqiang He, Beijing (CN); Dong Chai, Beijing (CN); Yiming Lei, Beijing (CN); Hong Wang, Beijing (CN); Jianmin Wu, Beijing (CN)

(73) Assignees: Beijing Zhongxiangying Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 438 days.

(21) Appl. No.: 18/253,961

(22) PCT Filed: Apr. 30, 2021

(86) PCT No.: PCT/CN2021/091775
§ 371 (c)(1),
(2) Date: May 23, 2023

(87) PCT Pub. No.: WO2022/227094
PCT Pub. Date: Nov. 3, 2022

(65) Prior Publication Data
US 2024/0004375 A1      Jan. 4, 2024

(51) Int. Cl.
G05B 19/418          (2006.01)

(52) U.S. Cl.
CPC .... G05B 19/41875 (2013.01); G05B 19/4184 (2013.01); G05B 2219/32187 (2013.01);
(Continued)

(58) Field of Classification Search
USPC ......................................................... 702/183
See application file for complete search history.

(56) References Cited

U.S. PATENT DOCUMENTS

| | | | | |
|---|---|---|---|---|
| 2004/0044484 A1* | 3/2004 | Obara | ............... | H01L 21/67253 702/35 |
| 2008/0077256 A1* | 3/2008 | Muenz | ................. | G05B 13/024 700/30 |

(Continued)

FOREIGN PATENT DOCUMENTS

| | | |
|---|---|---|
| CN | 109657945 A | 4/2019 |
| CN | 109711659 A | 5/2019 |

(Continued)

OTHER PUBLICATIONS

PCT International Search Report and Written Opinion (w/ English translations) for corresponding PCT Application No. PCT/CN2021/091775, mailed Jan. 26, 2022, 12 pages.

*Primary Examiner* — Paul D Lee
(74) *Attorney, Agent, or Firm* — Dority & Manning, P.A.

(57) ABSTRACT

A data processing method, comprising: acquiring a production record corresponding to each sample of a plurality of samples, the production record including process information, a production time corresponding to the process information, and an index value; determining a high-incidence time period of defects according to index values and production times corresponding to the process information in acquired production records of a plurality of samples; determining an influence degree of the process information on
(Continued)

sudden defect according to the high-incidence time period of defects and the acquired production records.

19 Claims, 11 Drawing Sheets

(52) U.S. Cl.
CPC .............. *G05B 2219/32196* (2013.01); *G05B 2219/32368* (2013.01)

(56) References Cited

U.S. PATENT DOCUMENTS

| | | | | |
|---|---|---|---|---|
| 2016/0342392 | A1* | 11/2016 | Tasaki ................ | G06Q 10/0639 |
| 2018/0203439 | A1* | 7/2018 | Hattori .................... | G06F 17/18 |
| 2019/0072945 | A1* | 3/2019 | Matsuyama ........... | G06N 20/00 |
| 2019/0354094 | A1 | 11/2019 | Lin et al. | |
| 2022/0182442 | A1* | 6/2022 | Chai ........................ | G06F 9/52 |
| 2022/0188307 | A1* | 6/2022 | Watanabe ........... | G06F 18/2193 |

FOREIGN PATENT DOCUMENTS

| | | | |
|---|---|---|---|
| CN | 110148132 | A | 8/2019 |
| CN | 110276410 | A | 9/2019 |
| CN | 110399996 | A | 11/2019 |
| CN | 110531722 | A | 12/2019 |
| CN | 111507859 | A | 8/2020 |
| CN | 111932394 | A | 11/2020 |
| CN | 112184691 | A | 1/2021 |

* cited by examiner

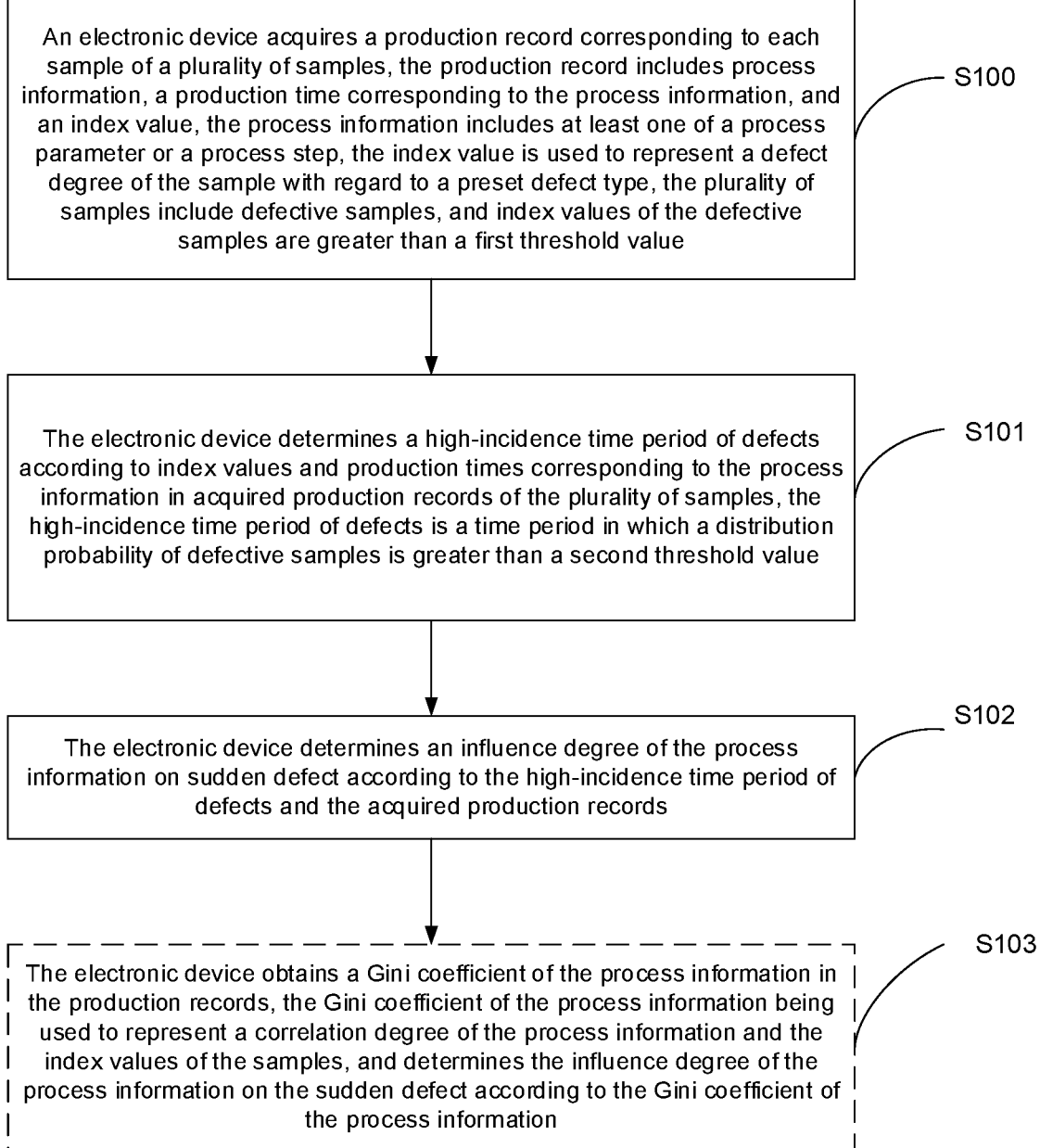

An electronic device acquires a production record corresponding to each sample of a plurality of samples, the production record includes process information, a production time corresponding to the process information, and an index value, the process information includes at least one of a process parameter or a process step, the index value is used to represent a defect degree of the sample with regard to a preset defect type, the plurality of samples include defective samples, and index values of the defective samples are greater than a first threshold value ⟋ S100

The electronic device determines a high-incidence time period of defects according to index values and production times corresponding to the process information in acquired production records of the plurality of samples, the high-incidence time period of defects is a time period in which a distribution probability of defective samples is greater than a second threshold value ⟋ S101

The electronic device determines an influence degree of the process information on sudden defect according to the high-incidence time period of defects and the acquired production records ⟋ S102

The electronic device obtains a Gini coefficient of the process information in the production records, the Gini coefficient of the process information being used to represent a correlation degree of the process information and the index values of the samples, and determines the influence degree of the process information on the sudden defect according to the Gini coefficient of the process information ⟋ S103

FIG. 4

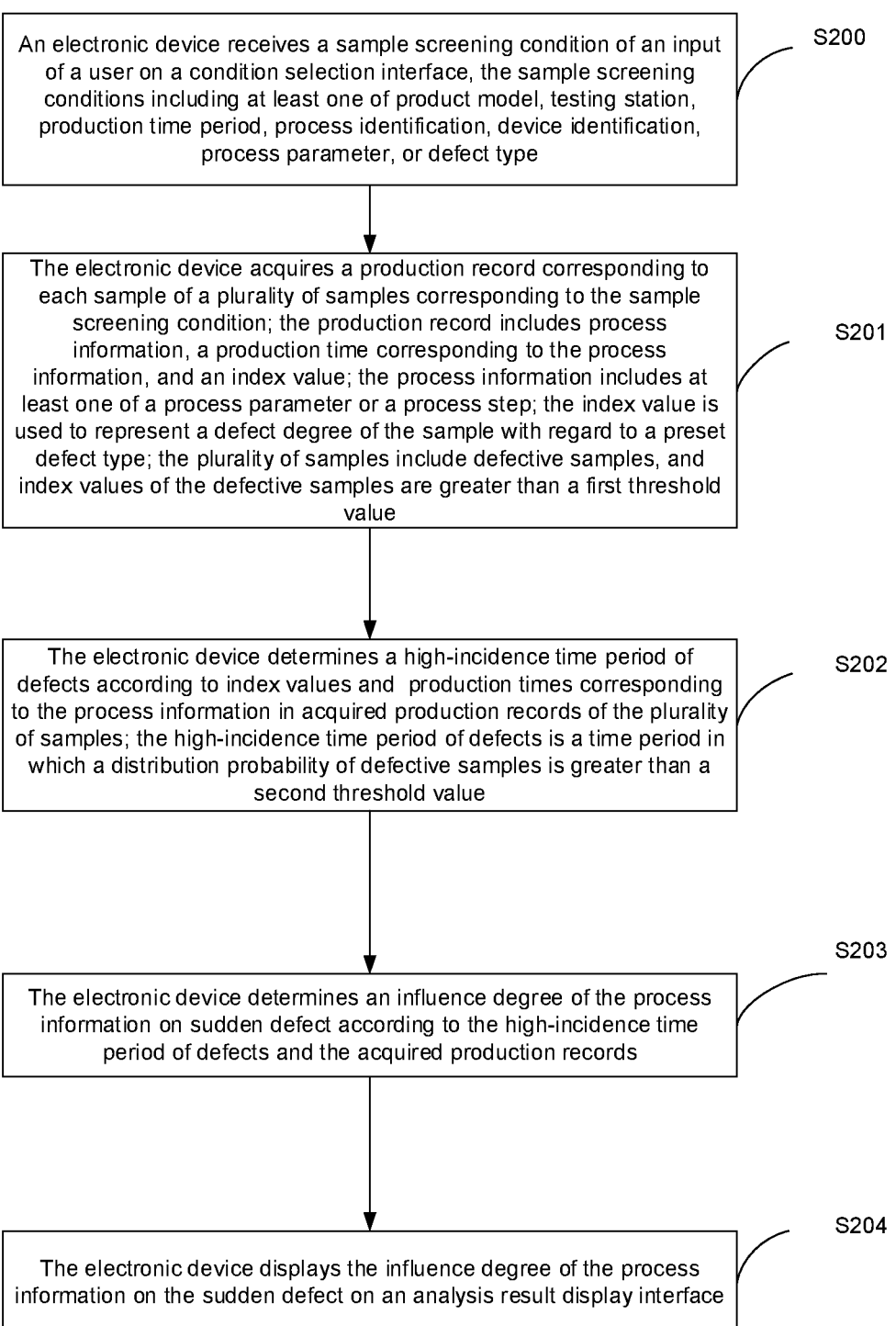

An electronic device receives a sample screening condition of an input of a user on a condition selection interface, the sample screening conditions including at least one of product model, testing station, production time period, process identification, device identification, process parameter, or defect type — S200

The electronic device acquires a production record corresponding to each sample of a plurality of samples corresponding to the sample screening condition; the production record includes process information, a production time corresponding to the process information, and an index value; the process information includes at least one of a process parameter or a process step; the index value is used to represent a defect degree of the sample with regard to a preset defect type; the plurality of samples include defective samples, and index values of the defective samples are greater than a first threshold value — S201

The electronic device determines a high-incidence time period of defects according to index values and production times corresponding to the process information in acquired production records of the plurality of samples; the high-incidence time period of defects is a time period in which a distribution probability of defective samples is greater than a second threshold value — S202

The electronic device determines an influence degree of the process information on sudden defect according to the high-incidence time period of defects and the acquired production records — S203

The electronic device displays the influence degree of the process information on the sudden defect on an analysis result display interface — S204

FIG. 9

Figure 10:
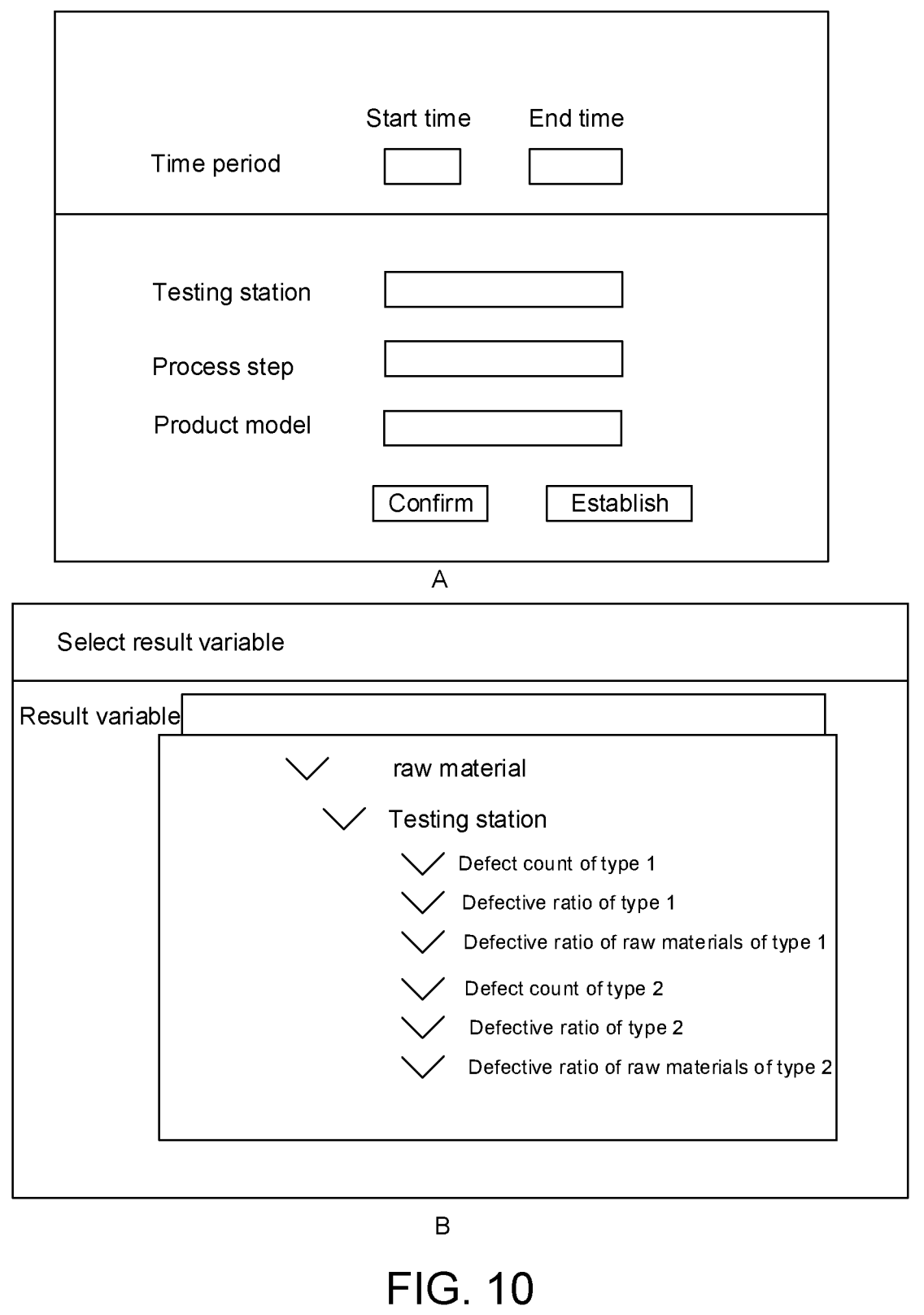

Start time        End time

Time period        ☐        ☐

Testing station        ☐

Process step        ☐

Product model        ☐

Confirm        Establish

A

Select result variable

Result variable|        ☐

∨        raw material

∨        Testing station

∨        Defect count of type 1

∨        Defective ratio of type 1

∨        Defective ratio of raw materials of type 1

∨        Defect count of type 2

∨        Defective ratio of type 2

∨        Defective ratio of raw materials of type 2

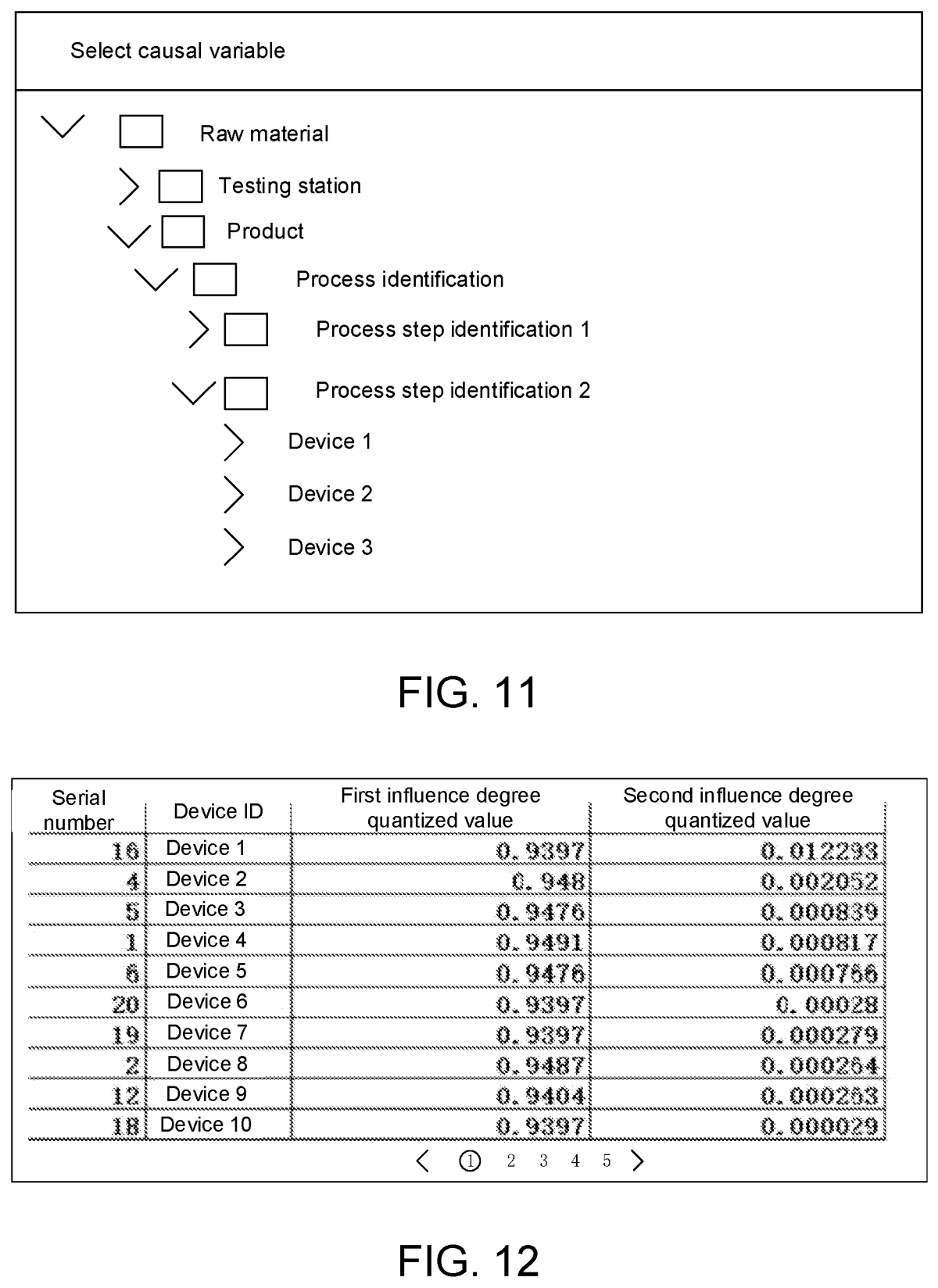

Select causal variable

∨  ☐  Raw material

> ☐  Testing station

∨ ☐  Product

∨ ☐  Process identification

> ☐  Process step identification 1

∨ ☐  Process step identification 2

>  Device 1

>  Device 2

>  Device 3

FIG. 11

| Serial number | Device ID | First influence degree quantized value | Second influence degree quantized value |
|---|---|---|---|
| 16 | Device 1 | 0.9397 | 0.012293 |
| 4 | Device 2 | 0.948 | 0.002052 |
| 5 | Device 3 | 0.9476 | 0.000839 |
| 1 | Device 4 | 0.9491 | 0.000817 |
| 6 | Device 5 | 0.9476 | 0.000766 |
| 20 | Device 6 | 0.9397 | 0.00028 |
| 19 | Device 7 | 0.9397 | 0.000279 |
| 2 | Device 8 | 0.9487 | 0.000264 |
| 12 | Device 9 | 0.9404 | 0.000263 |
| 18 | Device 10 | 0.9397 | 0.000029 |

DATA PROCESSING METHOD, AND ELECTRONIC DEVICE AND STORAGE MEDIUM FOR DETERMINING AN INFLUENCE DEGREE OF PROCESS INFORMATION ON A SUDDEN DEFECT

CROSS-REFERENCE TO RELATED APPLICATION

This application is a national phase entry under 35 USC 371 of International Patent Application No. PCT/CN2021/091775, filed on Apr. 30, 2021, which is incorporated herein by reference in its entirety.

TECHNICAL FIELD

The present application relates to the field of data processing technologies, and in particular, to data processing methods, electronic devices and storage mediums.

BACKGROUND

In the manufacturing process of products, process steps through which the product passes and process parameters corresponding to the process steps will affect the performance of the product, which may cause substandard performance (also referred to as defect) of the product. The process steps include devices through which the product passes in the manufacturing process. Therefore, for the product with substandard performance, there is a need to find out the cause of the substandard performance of the product according to the process steps and the process parameters.

SUMMARY

In an aspect, a data processing method is provided. The data processing method includes: acquiring a production record corresponding to each sample of a plurality of samples, the production record including process information, a production time corresponding to the process information, and an index value, the process information including at least one of a process parameter or a process step, the index value being used to represent a defect degree of the sample with regard to a preset defect type, the plurality of samples including defective samples, index values of the defective samples being greater than a first threshold value; determining a high-incidence time period of defects according to index values and production times corresponding to the process information in acquired production records of the plurality of samples, and determining an influence degree of the process information on sudden defect according to the high-incidence time period of defects and the acquired production records.

In some embodiments, in a case where the process information is the process step, determining the influence degree of the process information on the sudden defect according to the high-incidence time period of defects and the acquired production records includes: determining a target distribution of index values of samples in the high-incidence time period of defects on the production times corresponding to the process step in the acquired the production records; determining a difference value between the target distribution and a preset distribution, the difference value being used to represent a distribution probability of defective samples passing through the process step; and determining the influence degree of the process step on the sudden defect according to the difference value.

In some other embodiments, determining the target distribution of the index values of the samples in the high-incidence time period of defects on the production times corresponding to the process step includes: converting the production times corresponding to the process step into time numerical values corresponding to the process step; and determining a target distribution of the index values of the samples in the high-incidence time period of defects on the time numerical values corresponding to the process step.

In some other embodiments, determining the target distribution of the index values of the samples in the high-incidence time period of defects on the time numerical values corresponding to the process step includes: fitting the time numerical values corresponding to the process step into fitting index values by using a polynomial curve fitting method; and determining a distribution of the fitting index values on the time numerical values as the target distribution of the index values of the samples in the high-incidence time period of defects on the time numerical values corresponding to the process step.

In some other embodiments, the preset distribution is a standard normal distribution. The target distribution is a polynomial distribution. Determining the difference value between the target distribution and the preset distribution includes: obtaining the difference value between the target distribution and the standard normal distribution by using a significance test.

In some other embodiments, determining the high-incidence time period of defects according to the index values and the production times corresponding to the process information in the acquired production records includes: dividing the plurality of samples into non-defective samples and the defective samples according to the first threshold value and the index values in the acquired production records; and determining a time period, during which a ratio of a number of defective samples to a total number of the plurality of samples is greater than the second threshold value, in the acquired production records as the high-incidence time period of defects.

In some other embodiments, in a case where the process information is the process parameter, determining the influence degree of the process information on the sudden defect according to the high-incidence time period of defects and the acquired production records includes: obtaining a first production time by using an abrupt change point detection, the first production time being an abrupt change time point of the index values in the acquired production records, and the first production time being a time point in the high-incidence time period of defects; obtaining a critical change point of the process parameter in the production records, and determining a time corresponding to the critical change point as a second production time; determining a difference value between the first production time and the second production time; and determining an influence degree of the process parameter on the sudden defect according to the difference value.

In some other embodiments, obtaining the critical change point of the process parameter in the production records includes: obtaining Gini coefficients of values of the process parameter in the production records; and determining a value of the process parameter with a smallest Gini coefficient as the critical change point of the process parameter.

In some other embodiments, the data processing method further includes: obtaining a Gini coefficient of the process information in the production records, the Gini coefficient of the process information being used to represent a correlation degree between the process information and the index values of the plurality of samples; and determining the influence degree of the process information on the sudden defect according to the Gini coefficient of the process information.

In some other embodiments, in a case where the process information is the process step, the data processing method further includes: performing a chi-square test on the process step in the production records to obtain a chi-square test value of the process step to the index values of the plurality of samples, the chi-square test value being used to represent an influence degree of the process step on the index values of the plurality of samples; and determining the influence degree of the process information on the sudden defect according to the Gini coefficient of the process information includes: determining the influence degree of the process step on the sudden defect according to first preset weights of the chi-square test value and the Gini coefficient of the process step, the chi-square test value, and the Gini coefficient of the process step.

In some other embodiments, in a case where the process information is the process parameter, the data processing method further includes: performing a correlation test on the process parameter and the index values of the plurality of samples in the production records to obtain an influence parameter of the process parameter, the influence parameter being used to represent an influence degree of the process parameter on the index values of the plurality of samples; and determining the influence degree of the process information on the sudden defect according to the Gini coefficient of the process information includes: obtaining the influence degree of the process parameter on the sudden defect according to second preset weights of the influence parameter and the Gini coefficient of the process parameter, the influence parameter and the Gini coefficient of the process parameter.

In some other embodiments, acquiring the production record corresponding to each sample of the plurality of samples includes: obtaining a first corresponding relationship between a sample identification and the index value of each sample of the plurality of samples, and a second corresponding relationship between the sample identification, the process information, and the production time corresponding to the process information of each sample; and establishing a third corresponding relationship between the process information, the production time corresponding to the process information, and the index value of each sample according to the sample identification of each sample, the first corresponding relationship, and the second corresponding relationship.

In another aspect, a data processing method is provided. The data processing method includes: receiving a sample screening condition of an input of a user on a condition selection interface; acquiring a production record of each sample of a plurality of samples corresponding to the sample screening condition, the production record including process information, a production time corresponding to the process information, and an index value, the process information including at least one of a process parameter or a process step; the index value being used to represent a defect degree of the sample with regard to a preset defect type, the plurality of samples including defective samples, index values of the defective samples being greater than a first threshold value; determining a high-incidence time period of defects according to index values and production times corresponding to the process information in acquired production records of the plurality of samples, the high-incidence time period of defects being a time period in which a distribution probability of defective samples is greater than a second threshold value; determining an influence degree of the process information on sudden defect according to the high-incidence time period of defects and the acquired production records; and displaying the influence degree of the process information on the sudden defect on an analysis result display interface.

In some embodiments, displaying the influence degree of the process information on the sudden defect on the analysis result display interface includes: sorting influence degrees of pieces of acquired process information on the sudden defect; and displaying the influence degrees of the pieces of process information on the sudden defect after being sorted on the analysis result display interface.

In yet another aspect, an electronic device is provided. The electronic device includes a processor and a memory used to store instructions executable on the processor. The processor is configured to execute the instructions to implement the data processing method as described in any one of the above embodiments.

In yet another aspect, a non-transitory computer-readable storage medium is provided. The computer-readable storage medium has stored thereon computer program instructions that, when run on a processor, cause the processor to perform the data processing method as described in any one of the above embodiments.

In yet another aspect, a computer program product is provided. The computer program product includes computer program instructions stored on a non-transitory computer-readable storage medium. When executed by a computer, the computer program instructions cause the computer to perform the data processing method as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these accompanying drawings. In addition, the accompanying drawings to be described below may be regarded as schematic diagrams, but are not limitations on actual sizes of products, actual processes of methods and actual timings of signals involved in the embodiments of the present disclosure.

FIG. 4 is a flow diagram of a data processing method, in accordance with some embodiments;

FIG. 9 is a flow diagram of yet another data processing method, in accordance with some embodiments;

FIG. 10 is a structural diagram of a condition selection interface, in accordance with some embodiments;

FIG. 11 is a structural diagram of a causal variable input interface, in accordance with some embodiments;

FIG. 12 is a structural diagram of an analysis result display interface, in accordance with some embodiments;

DETAILED DESCRIPTION

Figure 1:
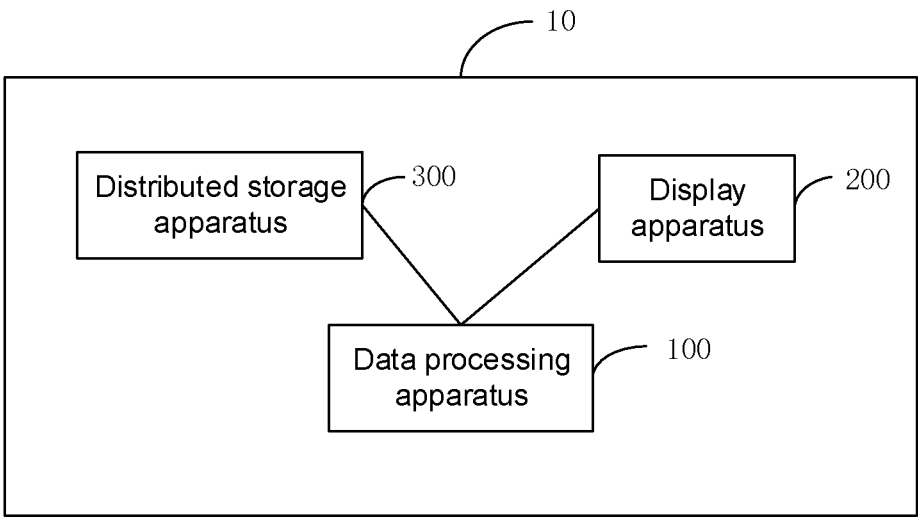
FIG. 1 is a structural diagram of a data processing system, in accordance with some embodiments.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

As used herein, the term "if", depending on the context, is optionally construed as "when", "in a case where", "in response to determining", or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values beyond those stated.

As used herein, the term "about" or "approximately" includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

In the related art, in a manufacturing process of a product, a device, through which the product passes, involved in any process step and device parameters will affect performance of the product, and may cause substandard performance (also referred to as defect) of the product. Due to complicated production processes and a large number of produced products, it is difficult to find out the cause of the defects manually. As a result, the timeliness and accuracy of processing data are limited, and cannot meet the requirements of the increasing demand for production. Based on this, some embodiments of the present disclosure provide a data processing method, and automatic diagnosis and analysis is performed through a data mining method. In the data processing method, a production record corresponding to each sample of a plurality of samples is acquired according to data generated in each production process in the entire factory, a high-incidence time period of defects according to index values of the samples and production times corresponding to process information in acquired production records of the plurality of samples is determined, an influence degree of the process information on sudden defect according to the high-incidence time period of defects and the acquired production records is determined, and the influence degree of the process information on sudden defect is converted into a quantized determination index (e.g., a correlation quantized value). Therefore, the detection efficiency is improved, which facilitates the user to make a comprehensive and quick decision to locate the cause of the sudden defect.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

The data processing method provided in the embodiments of the present disclosure is applicable to a data processing system 10 shown in FIG. 1. The data processing system 10 includes a data processing apparatus 100, a display apparatus 200 and a distributed storage apparatus 300. The data processing apparatus 100 is coupled to the display apparatus 200 and the distributed storage apparatus 300.

The distributed storage apparatus 300 is configured to store production data generated by a plurality of devices (which may also be referred to as factory equipment). For example, the production data generated by the plurality of devices includes production records of the plurality of devices. For example, the production records include identifications of devices through which the plurality of samples pass in their respective production processes, environment parameters corresponding to the devices, index values and production time of the plurality of samples. Each sample passes through at least one device in its production process.

The distributed storage apparatus 300 stores relatively complete data (such as a database). The distributed storage apparatus 300 may include a plurality of hardware memories, and different hardware memories are distributed in different physical locations (such as in different factories, or on different production lines), and communicate with each other through wireless transmission (such as the network), so that the data is distributed but logically forms a database based on big data technology.

A large amount of raw data of different sample devices is stored in corresponding manufacturing systems, e.g., in relational databases (e.g., Oracle or Mysql) of the systems such as a yield management system (YMS), a fault detection and classification (FDC), and a manufacturing execution system (MES). Such raw data may be extracted in an original table manner by a data extraction tool (e.g., Sqoop or Kettle) to be transmitted to the distributed storage apparatus 300 (e.g., a Hadoop distributed file system (HDFS)), so as to reduce the load on the devices and manufacturing systems, and facilitate data reading of the data processing apparatus 100 in a subsequent process.

Figure 2:
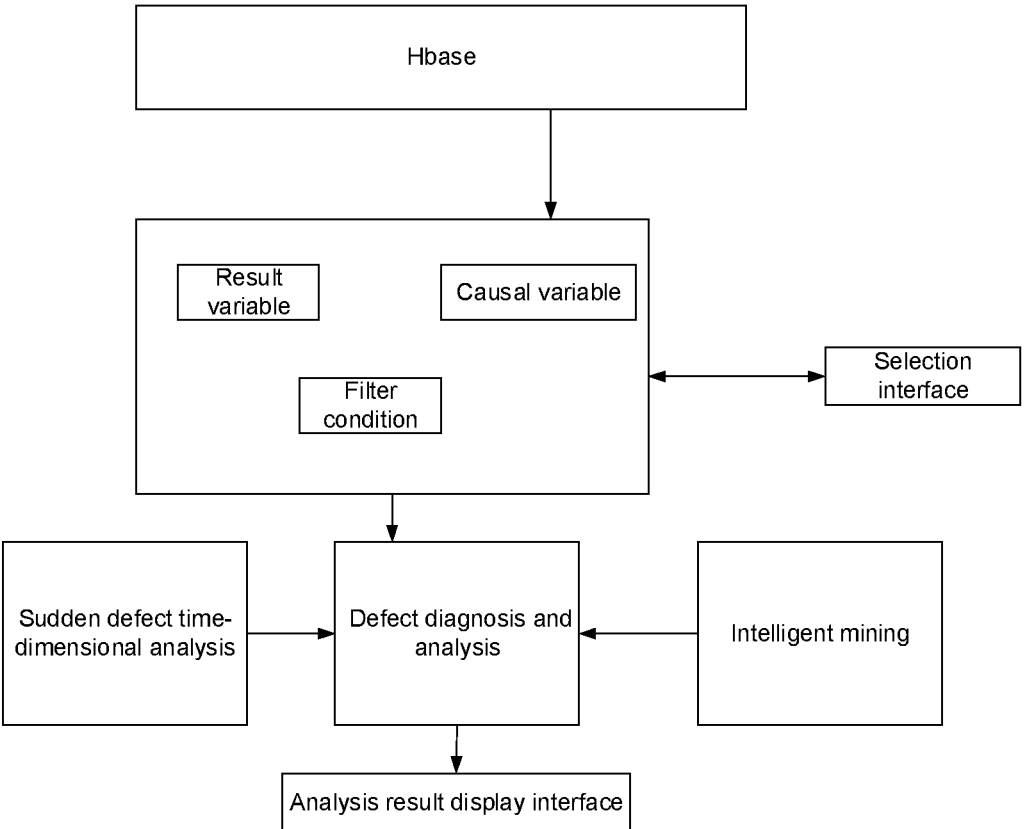
FIG. 2 is a structural diagram of a data processing system combined with data processing, in accordance with some embodiments.

Referring to FIG. 2, the data in the distributed storage apparatus 300 may be stored by a Hive tool or in an Hbase database format. For example, according to the Hive tool, the raw data is first stored in the database; then the raw data may be subjected to pretreatment (e.g., data cleaning and data conversion) in the Hive tool to obtain a data warehouse of the production records of the samples. The data warehouse may be connected to the display apparatus 200, the data processing apparatus 100, etc. through different application programming interfaces (APIs) to realize data interaction with these devices. The display apparatus 200 displays selection interfaces, and the selection interface is used for selection of screening conditions by a user. The screening conditions include result variables, causal variables and filter conditions (such as sample categories and preset time periods). The data processing apparatus 100 performs sudden defect time-dimensional analysis and/or intelligent mining to perform defect diagnosis and analysis, and then obtain an analysis result through the defect diagnosis and analysis. The display apparatus 200 displays the analysis result to the user on an analysis result display interface.

Since a plurality of devices in a plurality of factories are involved, the raw data is in a large volume. For example, all devices may generate several hundred gigabytes of raw data every day, and generate dozens of gigabytes of raw data every hour.

For example, there are mainly two solutions for the storage and calculation of massive structured data. One of the two solutions is a big data solution of a distributed file management system (DFS), and the other is that a relational database is used to realize the storage of the data, and a distributed computing is used to realize the calculation of the data.

The big data technology based on the DFS allows the use of a plurality of inexpensive hardware devices to build large clusters to process massive amounts of data. For example, the Hive tool is a data warehouse tool based on Hadoop, which may be used for data extraction, transformation and loading (ETL). The Hive tool defines a simple SQL-like query language, and also allows Mapper and Reducer in user-defined MapReduce to default complex analysis work that the tool cannot do. The Hive tool does not have a designated data storage format, nor does it create an index for the data. Users may freely organize tables therein to process the data in the database. It can be seen that, the parallel processing of the DFS may satisfy the storage and processing requirements of massive data. Users may use SQL query for simple data processing, and use custom functions to realize complex data processing. Therefore, during analysis of the massive data of a factory, the data of the factory's database needs to be extracted into a DFS. In this way, not only the raw data will not be damaged, but also the data analysis efficiency will be improved.

The relational database may be any one of Oracle, DB2, MySQL, Microsoft SQL Server, and Microsoft Access. The distributed computing is a process that a computing task is divided into a plurality of sub-tasks, and then the plurality of sub-tasks are assigned to a plurality of computer devices for simultaneous processing, and finally the processed results obtained by all the computer devices are collected to obtain a final result.

For example, the distributed storage apparatus 300 may be a single memory, a plurality of memories, or a general term for a plurality of storage elements. For example, the memories may include a random access memory (RAM) or a double data rate synchronous dynamic random access memory (DDR SRAM), or may include a non-volatile memory, such as a disk storage or a flash memory.

The data processing apparatus 100 may be any terminal device, server, virtual machine or server cluster.

For example, the display apparatus 200 may be a display or a product including a display, such as a television, a computer (an all-in-one computer or a desktop computer), a tablet computer, a mobile phone, an electronic picture screen. For example, the display apparatus may be any apparatus that displays an image whether in motion (e.g., a video) or stationary (e.g., a static image), and whether literal or graphical. More specifically, it is anticipated that the described embodiments may be implemented in or associated with a variety of electronic devices, such as (but not limited to) game consoles, television monitors, flat panel displays, computer monitors, automotive displays (e.g., odometer displays, etc.), navigators, cockpit controllers and/or displays, electronic photos, electronic billboards or signs, projectors, building structures, packaging, and aesthetic structures (e.g., a display for an image of a piece of jewelry).

For example, the display apparatus 200 described herein may include one or more displays, or include one or more terminals with a display function. Therefore, the data processing apparatus 100 may send data processed by the data processing apparatus 100 (such as the influencing parameters) to the display apparatus 200, and then the display apparatus 200 displays the processed data. That is, a complete interaction (controlling and receiving results) between the user and the data processing system 10 may be achieved through the interface (i.e., a user interaction interface) of the display apparatus 200.

It can be understood that, functions of the data processing apparatus 100, the display apparatus 200 and the distributed storage apparatus 300 may be integrated into one or two electronic devices, or may be implemented separately by different devices, which is not limited in the embodiments of the present disclosure.

Figure 3:
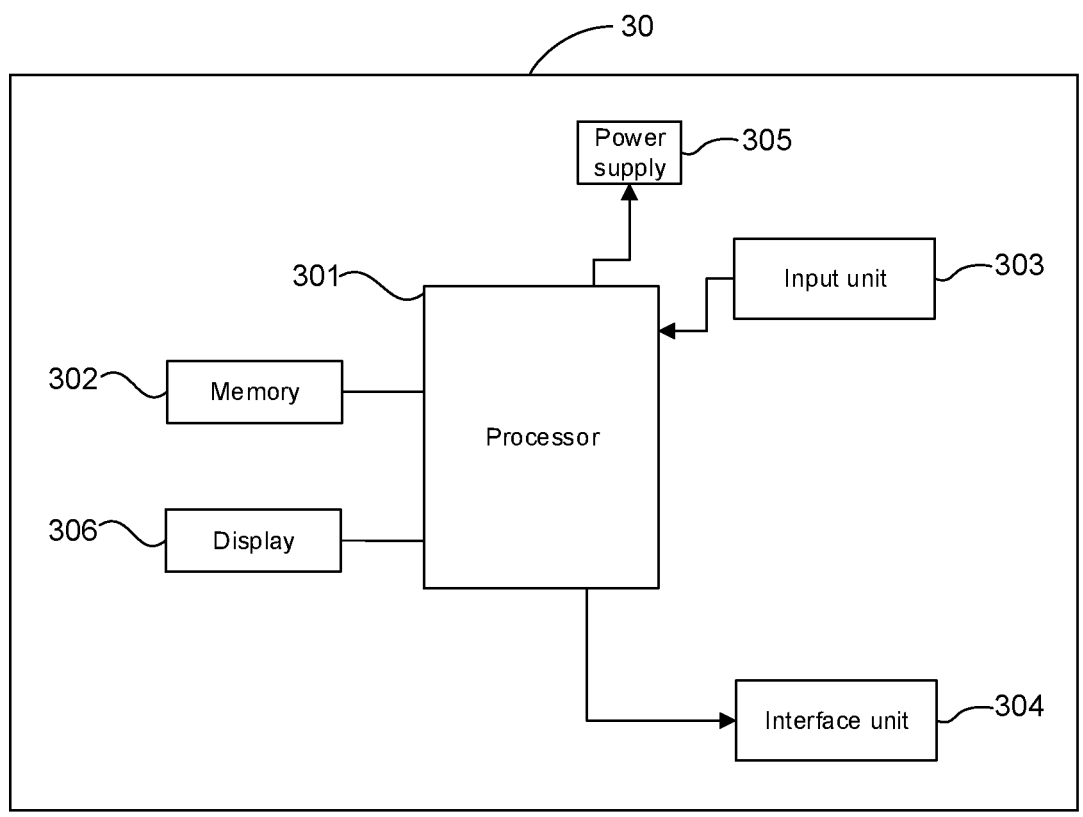
FIG. 3 is a structural diagram of an electronic device, in accordance with some embodiments.

The functions of the data processing apparatus 100, the display apparatus 200 and the distributed storage apparatus 300 may each be implemented by the electronic device 30 as shown in FIG. 3. The electronic device 30 shown in FIG. 3 includes but is not limited to: a processor 301, a memory

302, an input unit 303, an interface unit 304, and a power supply 305. Optionally, the electronic device 30 includes a display 306.

The processor 301 is a control center of the electronic device, and connects all parts of the entire electronic device through various interfaces and lines. By running or executing software programs and/or modules stored in the memory 302 and calling data stored in the memory 302, the processor 301 performs various functions of the electronic device and processes the data, thereby monitoring the overall electronic device. The processor 301 may include one or more processing units; optionally, the processor 301 may be integrated with an application processor and a modem processor. The application processor mainly deals with an operating system, a user interface, application programs, and the like, and the modem processor mainly deals with wireless communication. It can be understood that, the modem processor may also not be integrated in the processor 301.

The memory 302 may be used to store software programs and various data. The memory 302 may mainly include a program storage partition and a data storage partition. The program storage partition may store the operating system, application program(s) required by at least one function unit, and the like. In addition, the memory 302 may be a high-speed RAM, or may be a non-volatile memory, such as at least one disk storage, a flash memory or any other volatile solid state storage. Optionally, the memory 302 may be a non-transitory computer-readable storage medium. For example, the non-transitory computer-readable storage medium may be a read-only memory (ROM), a RAM, a CD-ROM, a magnetic tape, a floppy disk or an optical data storage.

The input unit 303 may be a device such as a keyboard or a touch screen.

The interface unit 304 is an interface for connecting an external device to the electronic device 30. For example, the external device may include a wired or wireless headset port, an external power supply (or battery charger) port, a wired or wireless data port, a memory card port, a port for connecting a device with an identification module, an audio input/output (I/O) port, a video I/O port, or a headphone port. The interface unit 304 may be used to receive input (e.g., data information) from the external device and transmit the received input to one or more elements in the electronic device 30, or the interface unit 304 may be used to transfer data between the electronic device 30 and the external device.

The power supply 305 (e.g., a battery) may be used to supply power to various components. Optionally, the power supply 305 may be logically connected to the processor 301 through a power management system, thereby implementing functions such as charging management, discharging management, and power consumption management through the power management system.

The display 306 is used to display information input by the user or information (such as data processed by the processor 301) provided to the user. The display 306 may include a display panel. The display panel may be configured in a form of a liquid crystal display (LCD) or an organic light-emitting diode (OLED), or the like. In a case where the electronic device 30 is the display apparatus 200, the electronic device 30 includes the display 306.

Optionally, computer instructions in the embodiments of the present disclosure may also be referred to as application program codes or systems, which are not specifically limited in the embodiments of the present disclosure.

It will be noted that, FIG. 3 only illustrates an example for the electronic device, which does not limit the electronic device to which the embodiments of the present disclosure are applicable. In actual implementations, the electronic device may include more or fewer devices than those shown in FIG. 3.

FIG. 4 is a flow diagram of a data processing method provided in some embodiments of the present disclosure. The method may be applied to the electronic device shown in FIG. 3. As shown in FIG. 4, the method may include following steps.

In S100, the electronic device acquires a production record corresponding to each sample of a plurality of samples, and the production record includes process information, a production time corresponding to the process information, and an index value. The process information includes at least one of a process parameter or a process step, and the index value is used to represent a defect degree of the sample with regard to a preset defect type. The plurality of samples include defective samples, and index values of the defective samples are greater than a first threshold value.

The first threshold value may be preset according to experience. Alternatively, the electronic device determines the first threshold value according to a distribution of the index value of each sample of the plurality of samples. For example, it is assumed that a sample is glass for producing panels, the index value of the sample is a defect ratio of the glass with regard to the preset defect type, and the defect ratio is a ratio of the number of defective panels produced by the glass to the total number of panels produced by the glass. If 90% of a plurality of glasses have a defect degree of 10%, then the electronic device determines that the first threshold value is 10%.

The process parameter includes at least one of temperature, pressure or flow. The process step may include at least one of a process identification or a device identification.

In a possible implementation, the memory or the distributed storage apparatus stores a first corresponding relationship between a sample identification and the index value, and a second corresponding relationship between the sample identification, the process information, and the production time corresponding to the process information. The electronic device acquires the first corresponding relationship and the second corresponding relationship from the memory or the distributed storage apparatus, and associates the index value in the first corresponding relationship with the process information and the production time corresponding to the process information in the second corresponding relationship through the sample identification, so as to obtain a third corresponding relationship between the process information, the production time corresponding to the process information and the index value of the sample. In this way, production records of the plurality of samples are obtained.

For example, the electronic device acquires identifications of display panels of a specific model from the Hbase database, and obtains a production record of each display panel according to the acquired identifications of the display panels.

It will be noted that the sample in the embodiments of the present disclosure may be a display panel in a production line for display panels. Of course, the sample in the embodiments of the present disclosure may also be any other product. The production record corresponding to the sample may further include a display panel motherboard (e.g., a glass), which may be produced into a plurality of display panels.

The preset defect type refers to a type of a quality defect of the sample, and the quality defect of the sample may cause the performance of the sample to be lower than a performance threshold. A division manner for the quality defect (also referred to as defect) of the sample is not limited in the present disclosure. For example, defects may be classified into different types according to needs. For example, the defects may be classified according to a direct influence that the defects have on a performance of the sample into, for example, a bright line defect, a dark line defect and a hot spot defect, etc.; or classified according to a specific cause of the defect into, for example, a signal line short circuit defect, an alignment defect, etc.; or classified according to a general cause of the defects into, for example, an array process defect, a color film process defect, etc.; or classified according to a severity of the defect into, for example, a defect leading to scrapping, a defect leading to lower quality, etc. Alternatively, the defects may not be classified. That is, as long as there is a defect in the sample, the sample is deemed to be defective, otherwise, it is deemed to be non-defective. In the embodiments of the present disclosure, the defect type of each sample of the plurality of samples is the same.

In another possible implementation, the electronic device receives the production record corresponding to each sample of the plurality of samples.

For example, part of the production records acquired by the electronic device is shown in Table 1 below. In Table 1, for example, the index value of the sample is a statistical index such as the thickness or the electrical parameter.

TABLE 1

| Sample identifi-cation | Process step | Device identifi-cation | Defect type | Index value | Production time |
|---|---|---|---|---|---|
| GlassID1 | Step 1 | Device 1 | VTH | −2.14833 | 2020 Mar. 25 12:18:13 |
| GlassID2 | Step 1 | Device 1 | VTH | −2.07028 | 2020 Mar. 26 14:12:06 |
| . . . | . . . | | . . . | . . . | . . . |
| GlassIDn | Step 1 | Device 1 | VTH | −2.16115 | 2020 Apr. 20 22:12:55 |

In Table 1, "GlassID1" is a sample identification; "Step 1" is a process step through which a sample represented by GlassID1 passes in the production process; "VTH" is a defect type of the sample represented by GlassID1, "−2.14833" is an index value of the sample represented by GlassID1, "2020-03-25 12:18:13" is a production time when the sample represented by GlassID1 passes through Step 1 in the production process; "Device 1" represents a device through which the sample represented by GlassID1 passes in Step 1 in the production process; n is a positive integer. The rest is similar to this, and details will not be provided here.

For another example, part of the production records acquired by the electronic device is shown in Table 2 below.

TABLE 2

| Sample identification | Process step | Process parameter | Parameter value | Index value | Production time |
|---|---|---|---|---|---|
| GlassID1 | Step 1 | Parameter 1 | 457 | 0.022 | 2020 May 7 05:49:55 |
| GlassID2 | Step 1 | Parameter 1 | 470 | 0.264 | 2020 May 14 10:40:55 |
| . . . | . . . | . . . | . . . | . . . | . . . |
| GlassIDn | Step 1 | Parameter 1 | 461 | 0.011 | 2020 May 17 12:54:14 |

In Table 2, "GlassID1" is a sample identification; "Step 1" is a process step through which a sample represented by GlassID1 passes in the production process; "Parameter 1" is a configuration parameter of the sample represented by GlassID1 when passing through Step 1, "457" is a value of Parameter 1, "0.022" is an index value of the sample represented by GlassID1, and "2020-05-07 05:49:55" is a production time when the sample represented by GlassID1 passes through Step 1 in the production process. The rest is similar to this, and details will not be provided here. It will be noted that, the value of the process parameter and the production time corresponding to the process parameter may be collected based on a certain event triggering. The value of the process parameter of the sample used in the embodiments of the present disclosure and the production time corresponding to the process parameter may be a value of one process parameter of a plurality of process parameters of the sample and a production time corresponding to the one process parameter.

It can be understood that, the production records acquired by the electronic device may be data that has been processed into the above form; alternatively, the electronic device may receive original production data of the samples, and then process the original production data of the samples into the above form of production records according to the sample identifications. The embodiments of the present disclosure do not limit thereto. It will be noted that, generally, an original source of the index value and an original source of the process information are different. In a case where the index value and the process information (e.g., the process step or the process parameter) come from different data sources, the electronic device may associate the index value with the process information through the sample identification.

In S101, the electronic device determines a high-incidence time period of defects according to the index values and the production times corresponding to the process information in the acquired production records, and the high-incidence time period of defects is a time period in which a distribution probability of the defective samples is greater than a second threshold value.

In a case where the process information is the process step, the electronic device divides the plurality of obtained samples into non-defective samples and defective samples according to the first threshold value and the index values in the acquired production records. Then, the electronic device determines a time period, during which a ratio of the number of part of the defective samples to the total number of the samples is greater than the second threshold value, in the acquired production records as the high-incidence time period of defects, where the time period refers to a period in which production times corresponding to process information of the part of the defective samples are located. The second threshold value may be preset according to experience, or may be determined by the electronic device according to the distribution of the defective samples.

Figure 5:
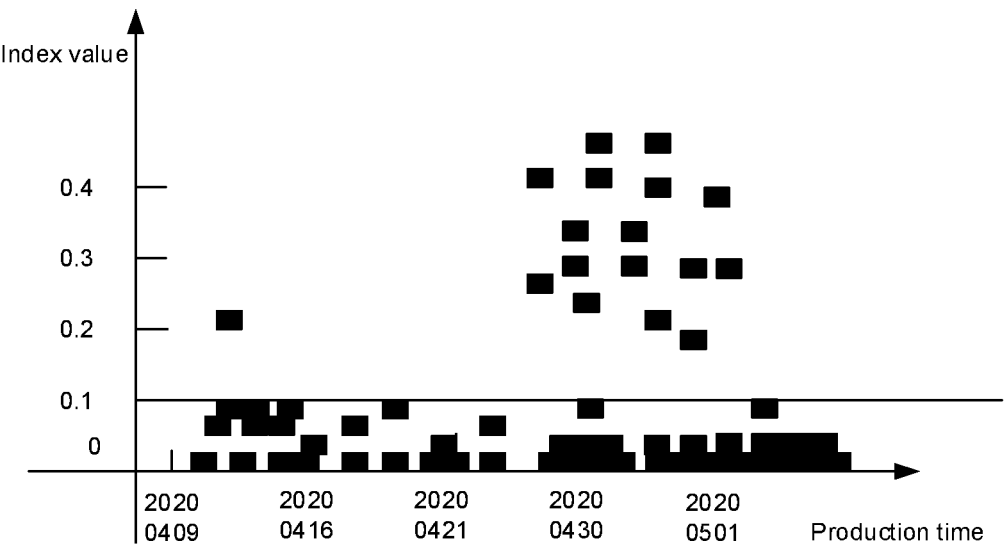
FIG. 5 is a diagram showing a distribution of non-defective samples and defective samples, in accordance with some embodiments.

For example, non-defective samples and defective samples divided by the electronic device are shown in FIG. 5. The horizontal axis in FIG. 5 represents the production time corresponding to the process step, and the vertical axis in FIG. 5 represents the index value of the sample. The first threshold value is 0.1. It can be understood that the horizontal axis may also represent the process step. The embodiments of the present disclosure do not limit thereto.

Based on the example shown in FIG. 5, the high-incidence time period of defects determined by the electronic device is from Apr. 30, 2020 (20200430) to May 1, 2020 (20200501).

In a case where the process information is the process parameter, the electronic device obtains a first production time according to an abrupt change point detection. The first production time is an abrupt change time point of the index values in the acquired production records. The first production time is a time point in the high-incidence time period of defects.

For example, the electronic device acquires a time series corresponding to the process parameters from the acquired production records, the time series being $x_1, x_2, x_3, \ldots, x_n$, and obtains the first production time by using a Pettitt method for the abrupt change point detection. The Pettitt method is a non-parametric test method, which may not only obtain the abrupt change point, but also quantify a statistical significance level of the abrupt change point. This method uses a rank-sum sequence to detect the abrupt change point.

The electronic device calculates a statistic $U_{t,n}$, the $U_{t,n}$ satisfy the following formula:

$$U_{t,n} = U_{t-1,n} + \sum_{i=1}^{n} \text{sgn}(x_t - x_i)(t = 2, 3, \ldots, n)$$

Here, $U_{t,n}$ is the statistic; n is the number of production times corresponding to the process parameters in the acquired production records; $x_i$ is any value in the time series $x_1, x_2, x_3, \ldots, x_n$, t is an integer and is greater than 2 and less than or equal to n;

$$U_{1,n} = \sum_{i=1}^{n} \text{sgn}(x_1 - x_i);$$

and i is a positive integer and is greater than 1 and less than or equal to n. If there is a time point t that satisfies k $t=\max_{1 \le t < n}|U_{t,n}|$, the time point t is an abrupt change point, $k_t$ is the greatest value of absolute values between $|U_{1,n}|$ and $$|U_{n,n}|. \ P = 2\exp\{-6k_t^2 / (n^3 + n^2)\},$$

and if P is less than or equal to 0.05 ($P \le 0.05$), it is considered that the detected abrupt change point is statistically significant. The electronic device determines that a production time corresponding to the time point t is the first production time. The first production time is the abrupt change time point of the index values (which is also referred to as a high-incidence time point of defects).

Figure 6:
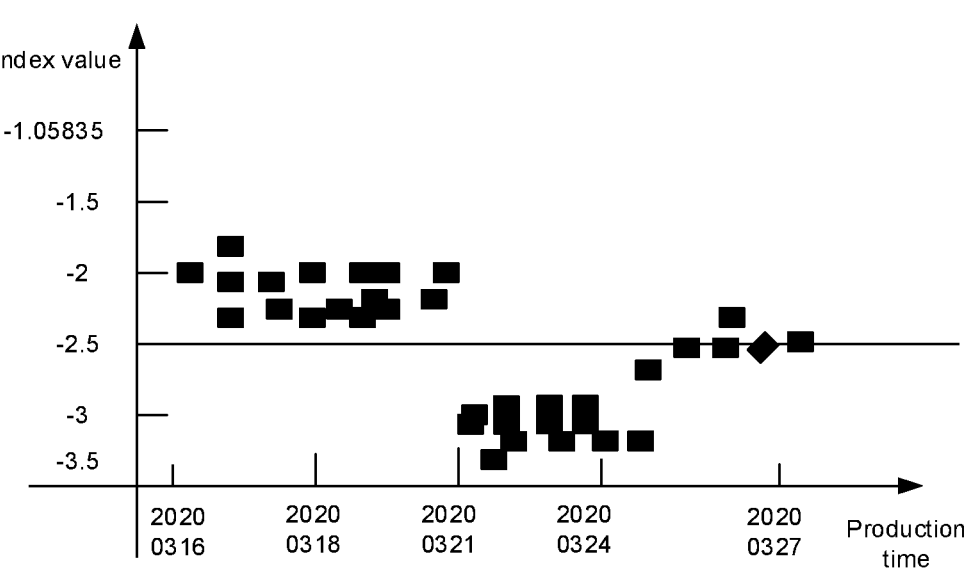
FIG. 6 is a diagram showing a distribution of index values of samples on production times, in accordance with some embodiments.

For example, as shown in FIG. 6, the index values suddenly drop below the third threshold value of −2.5 on Mar. 21, 2020 (20200321), and samples whose index values are lower than −2.5 are defective samples. The electronic device determines that Mar. 21, 2020 is the time point where the index values change abruptly.

In S102, the electronic device determines an influence degree of the process information on sudden defect according to the high-incidence time period of defects and the acquired production records.

In a case where the process information is the process step, the electronic device determines the influence degree of the process information on the sudden defect through the following steps.

In a first step, the electronic device determines a target distribution of the index values of the samples on the production times corresponding to the process step in the high-incidence time period of defects.

The electronic device converts the production times corresponding to the process step in the high-incidence time period of defects into time numerical values corresponding to the process step. Then, the electronic device determines a target distribution of the index values of the samples on the time numerical values corresponding to the process step in the high-incidence time period of defects.

Optionally, the electronic device fits the time numerical values corresponding to the process step into fitting index values using a polynomial curve fitting method, and determines a distribution of the fitting index values on the time numerical values as the target distribution of the index values of the samples on the time numerical values corresponding to the process step in the high-incidence time period of defects.

Optionally, the electronic device obtains a first difference value of difference values between the fitting index values and the index values of the samples, and in a case where the first difference value is less than or equal to a fourth threshold value, performs the following second step. The first difference value is the largest difference value of difference values between the fitting index values and the index values of the samples. The fourth threshold value may be set according to experience.

For example, the fourth threshold value is 0.6. The electronic device converts the production times corresponding to the process step into numerical values t1, t2, t3, tm, and obtains $x_1', x_2', x_3', \ldots, x_m'$ by fitting t1, t2, t3, ..., tm through a quartic polynomial curve fitting method. The index values of the samples corresponding to t1, t2, t3, ..., tm are index values x1, x2, x3, ..., xm, respectively. A value x' of $x_1', x_2', x_3', x_m'$ and a corresponding value t of t1, t2, t3, ..., tm satisfy the formula $x'=a_0+a_1t+a_2t^2+a_3t^3$. If the maximum error between $x_i'$ and a corresponding $x_i'$ is greater than 0.6, it means that t1, t2, t3, ..., tm is not an analysis range of the sudden defect. xi is any one index value of the index values x1, x2, x3, ..., xm. $x_i'$ is any one of $x_1', x_2', x_3', \ldots, x_m'$. If the maximum error between $x_i'$ and xi is less than or equal to 0.6, then the following second step is performed.

In the second step, the electronic device determines a second difference value between the target distribution and a preset distribution, and the second difference value is used to represent a distribution probability of defective samples passing through the process step.

It can be understood that the preset distribution is a distribution summed up based on experience, and the preset distribution may be a standard normal distribution. The electronic device obtains a difference value between the target distribution and the standard normal distribution using a significance test.

For example, the electronic device converts a standard normal distribution of the same time series t1, t2, t3, ..., tm into a probability density function to obtain $s_1, s_2, s_3, \ldots, s_m$, and performs the significance test on $s_1, s_2, s_3, \ldots, s_m$ and $x_1', x_2', x_3', \ldots, x_m'$. The electronic device determines the difference value between the standard normal distribution and the target distribution ($Si, s_2, s_3, \ldots, s_m$) and the target distribution ($x_1', x_2', x_3', \ldots, x^{m'}$) through a non-parametric test method of Mann-Whitney U test. It is assumed that two samples are from two populations that are identical except for means of the populations, which aims to test whether there is significant difference between the means of the two populations.

First, the two sets of data $(s_1, s_2, s_3, \ldots, s_m)$ and $(x_1', x_2', x_3', \ldots, x_m')$ are mixed, and all the data is sorted, and a value, i.e., a rank, is given according to the magnitudes of the values. Then, a rank sum of each of the two sets of data is calculated, the rank sum of $(s_1, s_2, s_3, \ldots, s_m)$ is $W_1$, and the rank sum of $(x_1', x_2', x_3', \ldots, x_m')$ is $W_2$. The statistics U1 and U2 of the two sets of data are calculated, and U1 and U2 and their respective $W_1$ and $W_2$ satisfy the following formula:

$$U_1 = m^2 + \frac{m(m+1)}{2} - W_1; \text{ and}$$

$$U_2 = m^2 + \frac{m(m+1)}{2} - W_2.$$

Here, m is the number of time points corresponding to the process step in the production records; $W_1$ is the rank sum of $s_1, s_2, s_3, \ldots, s_m$; and $W_2$ is the rank sum of $x_1', x_2', x_3', \ldots, x_m'$. The electronic device selects the smaller one of $U_1$ and $U_2$ as U to be compared with a preset critical value $U_a$. If U is less than $U_a$, the above assumption is rejected; that is, the difference value between the target distribution and the standard normal distribution is large. If U is greater than or equal to $U_a$, the above assumption is accepted, and it is considered that the two samples are from the same population, which means that the difference value between the target distribution and the standard normal distribution is small.

Figure 7:
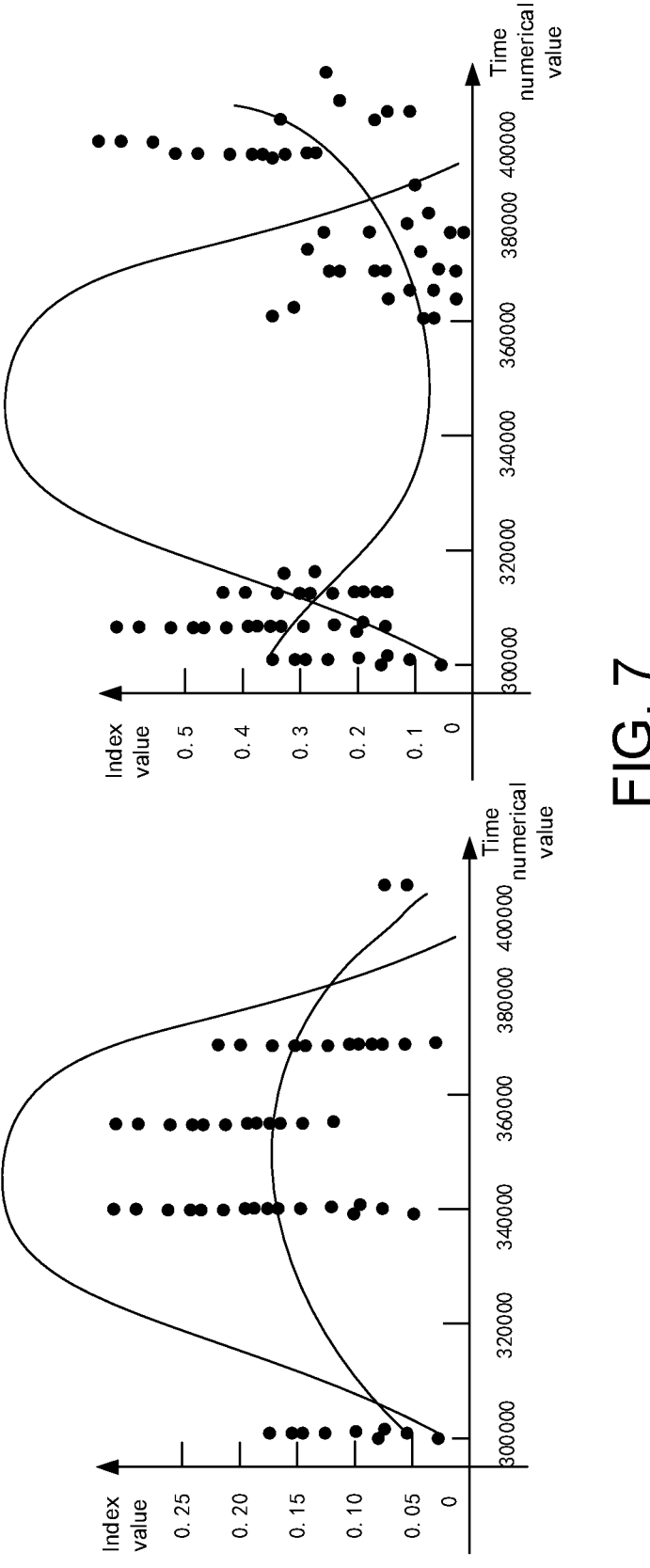
FIG. 7 is a diagram showing a comparison of a target distribution to a standard normal distribution, in accordance with some embodiments.

FIG. 7 is a comparison diagram between the target distribution and the standard normal distribution. A difference value between the target distribution and the standard normal distribution in the left chart of FIG. 7 is less than a difference value between the target distribution and the standard normal distribution in the right chart of FIG. 7.

In a third step, the electronic device determines the influence degree of the process step on the sudden defect according to the difference value.

Based on the U determined by the electronic device in the second step, the electronic device determines the influence degree p value of the process step on the sudden defect. For example, the electronic device converts the U into a value between 0 and 1 as the p value. The larger the p value, the less likely the above assumption to be rejected. The difference has no significant meaning, that is, the two sets of data have the same distribution; and accordingly, there is no sample with a low incidence probability of defect in a sudden time period, which means that the process step has a large influence degree on the sudden defect.

The influence degree of the process step corresponding to the left chart of FIG. 7 on the sudden defect is larger than the influence degree of the process step corresponding to the right figure of FIG. 7 on the sudden defect.

It will be noted that, by using the fitting index value obtained by the quartic polynomial curve fitting method, the result obtained in the process of determining the influence degree of the process step on the sudden defect is more accurate. The preset distribution is a summary of a distribution law of the index values of the samples in the case of sudden defect. The preset distribution may be a standard normal distribution, or may be other types of distribution such as an exponential distribution, which is not limited in the embodiments of the present disclosure.

It will be understood that the method of determining the influence degree of the process step on the sudden defect in the embodiments of the present disclosure is based on a consistency principle in the performance of the index values of the samples in the high-incidence time period of defects corresponding to a certain process step, that is, a principle of high concentration of abrupt change in the index values of the samples passing through the certain process step in the high-incidence time period of defects corresponding to the certain process step. For example, if there is no sample with a low incidence of defect in samples passing through a first process step in a high-incidence time period of defects of the first process step, and there are samples with a low incidence of defect in samples passing through a second process step in a high-incidence time period of defect of the second process step, an influence degree of the first process step on the sudden defect is larger than an influence degree of the second process step on the sudden defect.

In a case where the process information is the process parameter, the electronic device determines the influence degree of the process parameter on the sudden defect through following steps.

In a first step, the electronic device obtains a critical change point of the process parameter in the production records, and determines a time corresponding to the critical change point as a second production time.

In a possible implementation, the electronic device obtains Gini coefficients of values of the process parameter in the production records, determines a value of the process parameter with the smallest Gini coefficient as the critical change point of the process parameter, and determines the time corresponding to the critical change point as the second production time.

The electronic device takes each value of the process parameter in the production records as a cutpoint, determines a Gini coefficient of each cutpoint to obtain a plurality of Gini coefficients, determines a value of the process parameter with the smallest Gini coefficient as the critical change point of the process parameter, and determines the time corresponding to the critical change point as the second production time.

For example, the electronic device sorts values of a target process parameter by magnitude to obtain an array expressed as effect_data=$[x_1, x_2, x_3, \ldots, x_n]$, and obtains index values of samples corresponding to the values of the target process parameter expressed as cause_data=$[y_1, y_2, y_3, \ldots, y_n]$. The electronic device determines a Gini coefficient of each value of $y_1, y_2, y_3, \ldots, y_n$ of cause_data, determines the value of the process parameter with the smallest Gini coefficient as an abrupt change point, and determines the time corresponding to the abrupt change point as the second production time.

In a second step, the electronic device determines a difference value between the first production time and the second production time, and determines the influence degree of the process parameter on the sudden defect according to the difference value.

For example, it is assumed that an absolute value of a difference value between the first production time and a second production time of a first process parameter is 0.5 hours, and an absolute value of a difference value between the first production time and a second production time of a second process parameter is 8 hours, then an influence degree of the first process parameter on the sudden defect is larger than an influence degree of the second process parameter on the sudden defect. In the process of actual application, a time threshold value may be preset in the electronic device. In a case where a difference value between the first production time and the second production time is greater than the time threshold value, the electronic device determines that the influence degree of the process parameter of the second production time on the sudden defect is zero, which means that the process parameter has no influence on the sudden defect. In a case where the absolute value of the difference value between the first production time and the second production time is less than or equal to the time threshold value, the electronic device determines that the influence degree of the process parameter of the second production time on the sudden defect is 1, which means that the process parameter has an influence on the sudden defect.

It will be noted that, in the embodiments of the present disclosure, in the process that the electronic device determines the influence degree of the process parameter on the sudden defect, the electronic device may analyze each process parameter; alternatively, the electronic device determines a process step to be analyzed according to the determined influence degrees of the process steps on the sudden defect, and then analyzes process parameters of the process step to be analyzed to determine influence degrees of the process parameters on the sudden defect. In this way, it may be possible to determine influence degrees of a few process parameters on the sudden defect, so as to improve an efficiency of locating the cause of the sudden defect.

Optionally, in S103, the electronic device obtains a Gini coefficient of the process information in the production records, the Gini coefficient of the process information being used to represent a correlation degree between the process information and the index values of the samples; and determines an influence degree of the process information on the sudden defect according to the Gini coefficient of the process information.

In the case where the process information is the process step, the electronic device obtains the process step and the index values corresponding to the sample identifications from the production records, and obtains the Gini coefficient of the process step according to the process step and the index values corresponding to the sample identifications. The electronic device determines the influence degree of the process step on the sudden defect according to the Gini coefficient of the process step.

It is assumed that the first process step is used as a sub-node in a decision tree, i.e., a characteristic attribute of a binary classification, and the first process step has an influence on the defects of the samples, or has no influence on the defects of the samples. The electronic device may determine an influence degree of each process step through which the samples pass on the obtained index values of the samples using a Gini coefficient of an impurity measurement method in a CART tree of the decision tree. The smaller the Gini coefficient, the smaller the uncertainty and the greater the influence degree. In a K-class classification problem, the given number of a plurality of samples is D, the Gini coefficient of the plurality of samples is expressed as $$Gini(D) = 1 - \sum_{K=1}^{K} \left( \frac{|C_K|}{|D|} \right)^2,$$

where $C_K$ is the number of samples belonging to a K-th class. In a binary classification problem in the embodiments of the present disclosure, the total number of samples passing through the first process step is D, and $C_K$ is the number of defective samples in the total number D, and Gini(D) reflects, to a certain extent, the influence degree of the first process step on the defect of the samples.

Optionally, the electronic device performs a chi-square test on the process step in the production records to obtain a chi-square test value of the process step on the index values of the samples, and the chi-square test value is used to represent the influence degree of the process step on the index values of the samples. Then, the electronic device determines the influence degree of the process step on the sudden defect according to first preset weights of the chi-square test value and the Gini coefficient of the process step, the chi-square test value, and the Gini coefficient of the process step.

It will be understood that the chi-square test in statistics is a degree of deviation between an actual observed value and a theoretical expected value of statistical samples. The degree of deviation between the actual observed value and the theoretical expected value determines a magnitude of the chi-square test value. The larger the chi-square test value, the more disagreement between the actual observed value and the theoretical expected value. The smaller the chi-square test value, the smaller the deviation, and the more agreement between the actual observed value and the theoretical expected value. The most basic idea of the chi-square test is to determine whether a theory is correct by observing a deviation between an actual value and a theoretical value. The chi-square test value chicsquare satisfies the formula $$chicsquare = \sum_{i=1}^{n} \frac{(X_i - E)^2}{E},$$

and the formula expresses the deviation between the theoretical value of E and the actual value of x of n samples. In the embodiments of the present disclosure, for the device 1 represented by a certain device identification, it is assumed that the device 1 has no influence on the defect of the sample, and the device 1 and the defect of the sample are independent and irrelevant. The index values of the samples that pass though the device 1 are actually shown in Table 3 below. The theoretical value may be calculated according to a defective ratio of all samples, and the chi-square test value may be obtained from the above formula. The chi-square test value is substituted into a probability density function for calculating the chi-square distribution to obtain a pValue.

TABLE 3

|  | Defective | Non-defective |
| --- | --- | --- |
| Passing device 1 | subbad | subgood |
| Not passing device 1 | totalbad − subbad | totalgood − subgood |

In Table 3, subbad is the number of defective samples that pass through the device 1, subgood is the number of non-defective samples that pass through the device 1, totalbad-subbad is the number of defective samples that do not pass through the device 1, and totalgood-subgood is the number of non-defective samples that do not pass through the device 1.

It will be understood that the electronic device may use a chi-square test value corresponding to the process step 1 or a Gini coefficient corresponding to the process step 1 as an influence degree of the process step 1 on the index values of the samples. Alternatively, the electronic device may determine the influence degree of the process step on the sudden defect according to the first preset weights of the chi-square test value and the Gini coefficient of the process step, the chi-square test value and the Gini coefficient of the process step. For example, the first preset weight of the chi-square test value is 0.5, the first preset weight of the Gini coefficient is 0.5, and the electronic device obtains a first product of the chi-square test value and 0.5, obtains a second product of the Gini coefficient and 0.5, and uses a sum of the first product and the second product as the influence degree of the process step on the sudden defect.

In a case where the process information is the process parameter, the electronic device acquires the process parameter and the index values corresponding to the sample identifications from the production records, and obtains the Gini coefficient of the process parameter according to the process parameter and the index values corresponding to the sample identifications, and then, the electronic device determines the influence degree of the process parameter on the sudden defect according to the Gini coefficient of the process parameter.

As for the description of the method of obtaining the Gini coefficient of the process parameter, reference may be made to the above-mentioned method, which will not be repeated here.

Optionally, the electronic device performs a correlation test on the process parameter and the index values of the samples in the production records to obtain an influence parameter of the process parameter. The influence parameter is used to represent the influence degree of the process parameter on the index values of the samples. Then, the electronic device obtains the influence degree of the process parameter on the sudden defect according to second preset weights of the influence parameter and the Gini coefficient of the process parameter, the influence parameter and the Gini coefficient of the process parameter. The correlation test may be at least one of a normal distribution test, a homogeneity of variance test, or a T test.

For example, a second preset weight of the influence parameter is 0.4, a second preset weight of the Gini coefficient of the process parameter is 0.6, and the electronic device obtains a third product of the influence parameter and 0.4, obtains a fourth product of the Gini coefficient of the process parameter and 0.6, and uses a sum of the third product and the fourth product as the influence degree of the process parameter on the sudden defect.

Figure 8:
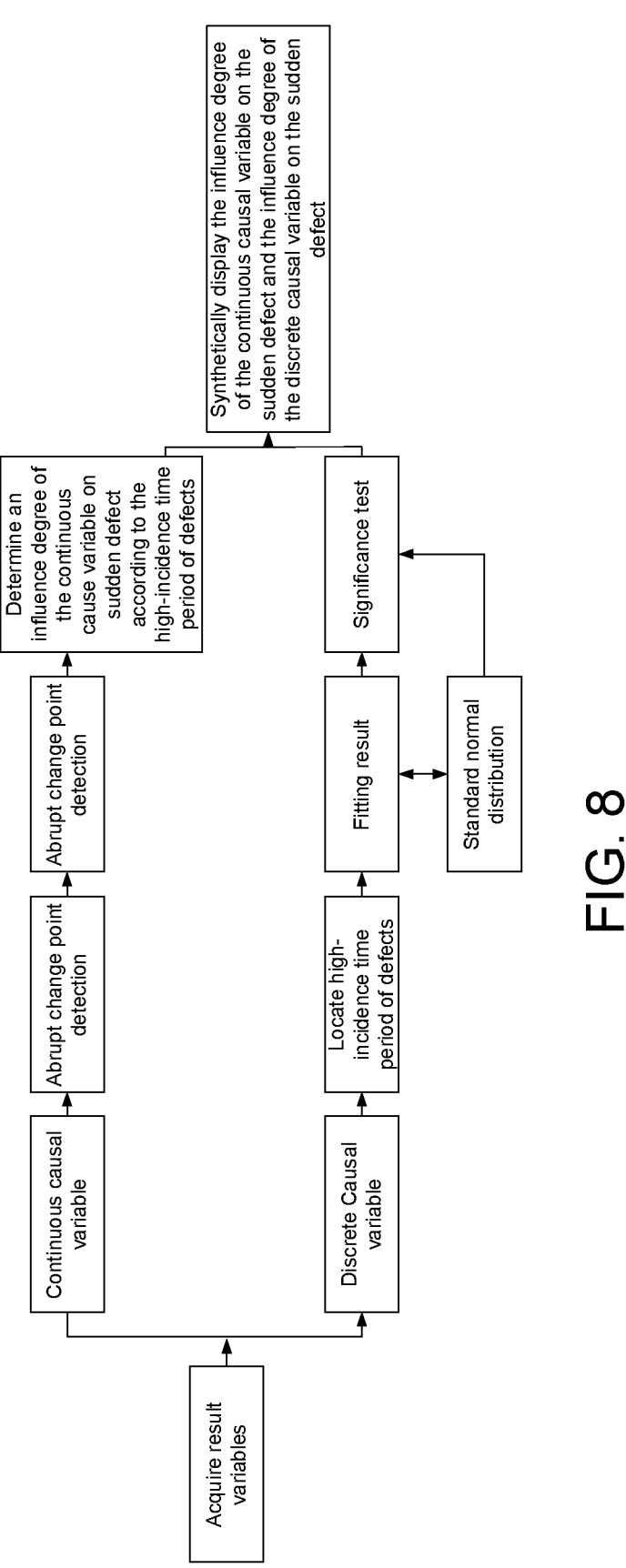
FIG. 8 is a flow diagram of another data processing method, in accordance with some embodiments.

FIG. 8 is a flow diagram of S100 to S102 in the embodiments of the present disclosure. The electronic device obtains the result variables (i.e., the index values) according to the acquired production records. Then, the electronic device obtains the causal variables, and divides the causal variables into continuous causal variables (e.g., the process parameters) and discrete causal variables (e.g., the process steps). For the continuous causal variable, the electronic device determines the high-incidence time point of the defects of the result variables and the critical change point of the continuous causal variable using the abrupt change point detection, and determines the influence degree of the continuous cause variable on the sudden defect according to the high-incidence time point of the defects and the critical change point. For the discrete causal variable, the electronic device locates a high-incidence time period of defects, and fits result variables and the discrete causal variable in the high-incidence time period of defects, and performs a significance test on the fitting result with the standard normal distribution to obtain the influence degree of the discrete cause variable on the sudden defect. Then, the electronic device synthetically displays the influence degree of the continuous cause variable on the sudden defect and the influence degree of the discrete cause variable on the sudden defect.

It will be understood that, in the embodiments of the present disclosure, the final determined result is the influence degree of each process parameter of the plurality of process parameters on the sudden defect, and/or the influence degree of each process step of the plurality of process steps on the sudden defect. The electronic device displays the determined result. In this way, the user may determine one or more pieces of process information that have the greatest influence on the sudden defect from the displayed result, so as to locate the cause of the sudden defect.

It will be understood that, in the embodiments of the present disclosure, the electronic device may acquire source production information of each sample of the plurality of samples (e.g., sample identifications and index values of the samples represented by the sample identifications stored in one device, and sample identifications and process information corresponding to the sample identifications stored in other devices) once, and stores the source production information in the electronic device or other intermediate devices. In different steps described above, in the process of acquiring data (such as the production records, the process steps, the process parameters, and the production time), the electronic device may acquire the data from the electronic device or other devices that store the production information of the plurality of samples. In this way, the data processing speed is increased. The data storage format is not limited in the embodiments of the present disclosure. For example, the data storage format may be a parquet format.

In the embodiments of the present disclosure, the electronic device determines the high-incidence time period of defects according to the index values in the acquired production records and the production times corresponding to the process information. Then, the electronic device determines the influence degree of the process information on the sudden defect according to the high-incidence time period of defects and the acquired production records. In this way, the electronic device may mine the correlation influence of the time trend of the sudden defect of the samples, and quantify it as a numerical value, which may provide the user with more accurate and comprehensive data to locate the cause of the defect.

FIG. 9 is a flow diagram of another data processing method provided in the embodiments of the present disclosure. The method may be applied to the electronic device shown in FIG. 3. The method shown in FIG. 9 may include the following steps.

In S200, the electronic device receives a sample screening condition of an input of the user on a condition selection interface. The sample screening condition includes at least one of product model, testing station, production time period, process identification, device identification, process parameter, or defect type.

For example, the condition selection interface displayed by the electronic device is shown in FIG. 10. Part A of FIG. 10 includes a time period input box, a testing station input box, a product model input box, a process (i.e., process step) input box, etc. Part B of FIG. 10 is a defect type input box interface. In FIG. 10, the raw material may be a panel motherboard, and the testing station may be used for selection of a testing station by the user. The testing station includes at least six defect types. The defect count of type 1 may be used for selection of the number of defective samples of type 1 as a defect type by the user. The defective ratio of type 1 may be used for selection of the defective ratio of samples of type 1 as another defect type by the user. The defective ratio of raw materials of type 1 may be used for selection of the defective ratio of the raw materials of type 1 as yet another defect type by the user. The defect count of type 2 may be used for selection of the number of defective samples of type 2 as yet another defect type by the user. The defective ratio of type 2 may be used for selection of the defective ratio of samples of type 2 as yet another defect type by the user. The defective ratio of raw materials of type 2 may be used for selection of the defective ratio of the raw materials of type 2 as yet another defect type by the user.

Optionally, the screening condition further includes causal variable. For example, a causal variable input interface displayed by the electronic device is shown in FIG. 11. The raw material in FIG. 11 may be a panel motherboard. The testing station in FIG. 11 may be used for selection of a testing station of the user, and the product may be used for selection of a product model by the user. The process identification in FIG. 11 may be used for selection of a corresponding process by the user, and one process corresponds to at least one process step. The process step identification 1 and the process step identification 2 in FIG. 11 may each be used for selection of a process step by the user. The process step with the process step identification 2 in FIG. 11 corresponds to at least three devices, where the device 1 corresponds to a device, the device 2 corresponds to another device, and the device 3 corresponds to yet another device.

In S201, the electronic device acquires a production record corresponding to each sample of a plurality of samples corresponding to the sample screening condition; the production record includes process information, production time corresponding to the process information, and an index value; the process information includes at least one of a process parameter or a process step; the index value is used to represent a defect degree of the sample with regard to a preset defect type. The plurality of samples include defective samples, and index values of the defective samples are greater than a first threshold value.

As for the specific description, reference may be made to the method of acquiring the production records by the electronic device in S100, which will not be repeated here.

In the embodiments of the present disclosure, the index value may be a defective ratio of a defect type, or a defect count of the defect type. In the embodiments of the present disclosure, whether Qtest measurement data (such as thickness or electrical parameter) reaches a standard may be used to determine whether the sample is defective or non-defective.

In S202, the electronic device determines a high-incidence time period of defects according to index values and production times corresponding to the process information in acquired production records of the plurality of samples. The high-incidence time period of defects is a time period when a distribution probability of defective samples is greater than a second threshold value.

As for the specific description, reference may be made to the above description of S101, and details will not be repeated here.

In S203, the electronic device determines an influence degree of the process information on sudden defect according to the high-incidence time period of defects and the acquired production records.

As for the specific description, reference may be made to the above description of S102, and details will not be repeated here.

In S204, the electronic device displays the influence degree of the process information on the sudden defect on an analysis result display interface.

Optionally, the electronic device sorts influence degrees of pieces of acquired process information on the sudden defect, and then displays the influence degrees of the pieces of process information on the sudden defect after being sorted on the analysis result display interface.

For example, the electronic device sorts the influence degrees of the plurality of pieces of acquired process information on the sudden defect in descending order, and displays the influence degrees of the pieces of process information on the sudden defect after being sorted. In this way, the process information that has the greatest influence degree on the sudden defect will be ranked first, which is convenient for the user to view.

It can be understood that the electronic device may determine an influence degree quantized value of the process step on the sudden defect according to a preset weight and a plurality of influence degree quantized values of the process step on the sudden defect, and display the influence degree quantized value of the process step on the sudden defect. Alternatively, the electronic device displays each influence degree quantized value of the process step on the sudden defect. Similarly, the electronic device may determine an influence degree quantized value of the process parameter on the sudden defect according to a preset weight and a plurality of influence degree quantized values of the process parameter on the sudden defect, and display the influence degree quantized value of the process parameter. Alternatively, the electronic device displays each influence degree quantized value of the process parameter on the sudden defect.

FIG. 12 shows influence degree quantized values of device identifications on the sudden defect displayed by the electronic device on the analysis result display interface. In FIG. 12, 16 in the column of the serial number is a serial number of a row of data, and device 1 is a device identification. A first influence degree quantized value 0.9397 is an influence degree quantitative value of a device with a device identification of device 1 on the sudden defect. A second influence degree quantized value 0.012293 is another influence degree quantized value of a device with a device identification of device 1 on the sudden defect, which is obtained by a time dimension analysis. The rest of data is similar to this, and detail will not be repeated here.

The foregoing mainly described the solutions provided in the embodiments of the present disclosure from a method perspective. In order to achieve the above functions, corresponding hardware structures and/or software modules for performing various functions are included herein. A person skilled in the art will easily realize that, in combination with units and algorithm steps of the examples described in the embodiments disclosed herein, the present disclosure may be implemented by hardware or a combination of hardware and computer software. Whether a certain function is implemented by hardware or in a way of driving hardware by computer software depends on specific applications and design constraints of the technical solution. A skilled person may implement the described functions in different ways for each specific application, but such implementation should not be considered beyond the scope of the present disclosure.

In the embodiments of the present disclosure, functional modules of the electronic device in the embodiments may be divided based on the above method examples. For example, the functional modules may be divided according to functions thereof, or two or more functions may be integrated into one processing module. The above integrated modules may be implemented in the form of hardware or software functional modules. It will be noted that, the division of the modules in the embodiments of the present disclosure is schematic, and is only a logical function division, and there may be other manners to divide the functional modules in actual implementation.

Figure 13:
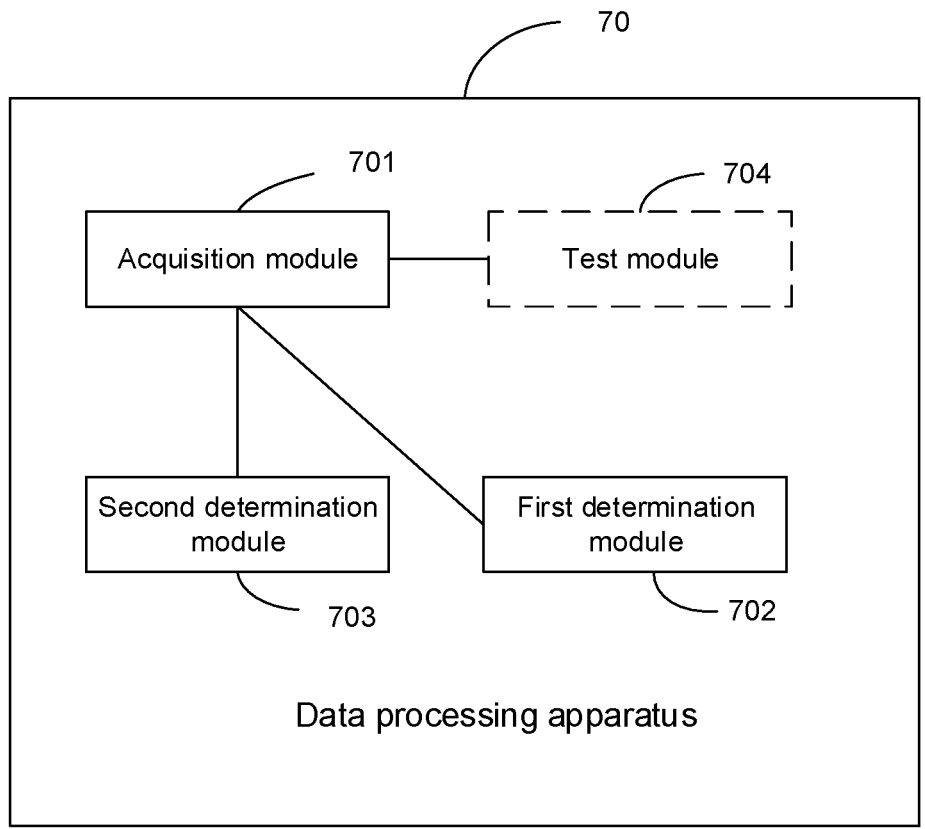
FIG. 13 is a structural diagram of a data processing apparatus, in accordance with some embodiments.

FIG. 13 is a structural diagram of a data processing apparatus 70 provided in embodiments of the present disclosure. The data processing apparatus 70 includes: an acquisition module 701, a first determination module 702, and a second determination module 703. The acquisition module 701 is used to acquire a production record corresponding to each sample of a plurality of samples. The production record includes process information, a production time corresponding to the process information and an index value. The process information is a process parameter and/or a process step. The index value is used to represent a defect degree of the sample with regard to a preset defect type. The plurality of samples include defective samples, and index values of the defective samples are greater than a first threshold value. The first determination module 702 is used to determine a high-incidence time period of defects according to index values and production times corresponding to process information in acquired production records of the plurality of samples, and the high-incidence time period of defects is a time period in which a distribution probability of the defective samples is greater than a second threshold value. The determination module 703 is used to determine an influence degree of the process information on sudden defect according to the high-incidence time period of defects and the acquired production records. For example, with reference to FIG. 4, the acquisition module 701 may be used to perform S100, the first determination module 702 may be used to perform S101, and the second determination module 703 may be used to perform S102.

In some embodiments, in a case where the process information is the process step, the second determination module 703 is used to: determine a target distribution of index values of samples in the high-incidence time period of defects on the production times corresponding to the process step; determine a difference value between the target distribution and a preset distribution, the difference value being used to represent a distribution probability of defective samples passing through the process step; and determine the influence degree of the process step on the sudden defect according to the difference value.

In some other embodiments, the second determination module 703 is used to: convert the production times corresponding to the process step into time numerical values corresponding to the process step, and determine a target distribution of the index values of the samples in the high-incidence time period of defects on the time numerical values corresponding to the process step.

In some other embodiments, the second determination module 703 is used to: fit the time numerical values corresponding to the process step into fitting index values using a polynomial curve fitting method, and determine a distribution of the fitting index values on the time numerical values as the target distribution of the index values of the samples in the high-incidence time period of defects on the time numerical values corresponding to the process step.

In some other embodiments, the preset distribution is a standard normal distribution, and the target distribution is a polynomial distribution. The second determination module 703 is used to obtain the difference value between the target distribution and the standard normal distribution using a significance test.

In some other embodiments, the first determination module 702 is used to: divide the plurality of samples into non-defective samples and the defective samples according to the first threshold value and the index values in the acquired production records, and determine a time period, during which a ratio of the number of defective samples to the total number of the plurality of samples is greater than the second threshold value, in the acquired production records as the high-incidence time period of defects. The time period is a time period in which the production times corresponding to the process information are located.

In some other embodiments, in a case where the process information is the process parameter, the acquisition module 701 is further used to: obtain a first production time using an abrupt change point detection, the first production time being an abrupt change time point of the index values, and the first production time being a time point in the high-incidence time period of defects; and obtain a critical change point of the process parameter in the production records, and determine a time corresponding to the critical change point as a second production time. The second determination module 703 is used to determine a difference value between the first production time and the second production time, and determine an influence degree of the process parameter on the sudden defect according to the difference value.

In some other embodiments, the acquisition module 701 is further used to obtain Gini coefficients of values of the process parameter in the production records, and determine a value of the process parameter with the smallest Gini coefficient as the critical change point of the process parameter.

In some other embodiments, the acquisition module 701 is further used to obtain a Gini coefficient of the process information in the production records. The Gini coefficient of the process information is used to represent a correlation degree between the process information and the index values of the samples. The second determination module 703 used to determine the influence degree of the process information on the sudden defect according to the Gini coefficient of the process information.

In some other embodiments, the production record further includes a sample identification. In a case where the process information is the process parameter, the acquisition module 701 is used to: acquire the process parameter and the index values corresponding to the sample identifications from the production records, and obtain the Gini coefficient of the process parameter according to the process parameter and the index values corresponding to the sample identifications.

In some other embodiments, the production record further includes a sample identification. In a case where the process information is the process step, the acquisition module 701 is used to: acquire the process step and the index values corresponding to the sample identifications from the production records, and obtain the Gini coefficient of the process step according to the process step and the index values corresponding to the sample identifications.

In some other embodiments, as shown in FIG. 13, the data processing apparatus further includes a test module 704 used to perform a chi-square test on the process step in the production record to obtain a chi-square test value of the process step to the index values of the samples. The chi-square test value is used to represent an influence degree of the process step on the index values of the samples. The second determination module 703 is used to determine the influence degree of the process step on the sudden defect according to first preset weights, the chi-square check value, and the Gini coefficient of the process step.

In some other embodiments, the test module 704 is further used to: perform a correlation test on the process parameter and the index values of the samples in the production records to obtain an influence parameter of the process parameter. The influence parameter is used to represent an influence degree of the process parameter on the index values of the samples. The second determination module 703 is used to obtain the influence degree of the process parameter on the sudden defect according to second preset weights, the influence parameter and the Gini coefficient of the process parameter.

In some embodiments, the acquisition module 701 is used to: obtain a first corresponding relationship between the sample identification and the index value of each sample of the plurality of samples, and a second corresponding relationship between the sample identification, the process information, and the production time corresponding to the process information of each sample; and establish a third corresponding relationship between the process information, the production time corresponding to the process information, and the index value of each sample according to the sample identification of each sample, the first corresponding relationship, and the second corresponding relationship.

For example, referring to FIG. 3, a receiving function of the acquisition module 701 may be implemented by the interface unit 304 in FIG. 3. The processing function of the acquisition module 701, the first determination module 702, the second determination module 703, and the test module 704 may be implemented by the processor 301 in FIG. 3 calling the software programs stored in the memory 302.

As for specific descriptions of the foregoing optional manners, reference may be made to the description of the foregoing method embodiments, and details will not be repeated here. In addition, as for explanation of the data processing apparatus 70 and the description of the beneficial effects of the data processing apparatus 70 in any application example provided above, reference may be made to the corresponding method embodiments described above, and details will not be repeated here.

It will be noted that, operations correspondingly performed by the above modules are only specific examples, and as for the actions actually performed by various modules, reference may be made to the operations or steps in the above description of the embodiments based on FIG. 4.

Figure 14:
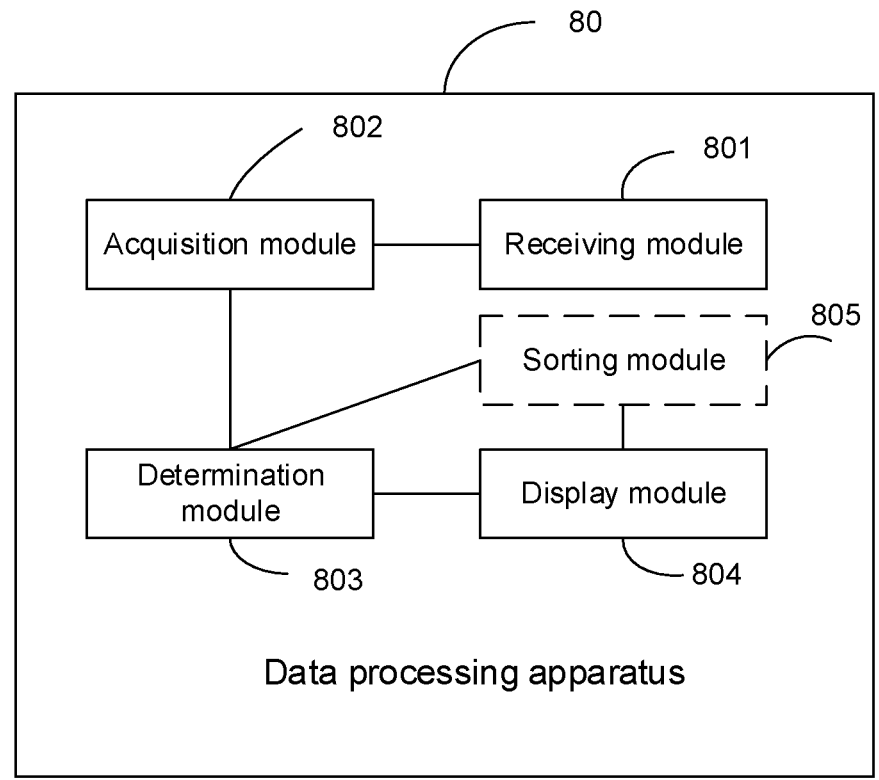
FIG. 14 is a structural diagram of another data processing apparatus, in accordance with some embodiments.

FIG. 14 is a structural diagram of another data processing apparatus 80 provided in embodiments of the present disclosure. The data processing apparatus 80 includes a receiving module 801, an acquisition module 802, a determination module 803, and a display module 804. The receiving module 801 is used to receive a sample screening condition of an input of the user on a condition selection interface. The acquisition module 802 is used to obtain a production record of each sample of a plurality of samples corresponding to the sample screening condition. The production record includes process information, a production time corresponding to the process information and an index value. The process information is a process parameter and/or a process step. The index value is used to represent a defect degree of the sample with regard to a preset defect type. The plurality of samples include defective samples, and index values of the defective samples are greater than a first threshold value. The determination module 803 is used to: determine a high-incidence time period of defects according to index values and production times corresponding to process information in acquired production records of the plurality of samples, and the high-incidence time period of defects being a time period in which a distribution probability of the defective samples is greater than a second threshold value; and determine an influence degree of the progress information on sudden defect according to the high-incidence time period of defects and the acquired production records. The display module 804 is used to display the influence degree of the progress information on the sudden defect on the analysis result display interface. For example, with reference to FIG. 9, the receiving module 801 may be used to perform S200, the acquisition module 802 may be used to perform S201, the determination module 803 may be used to perform S202 to S203, and the display module 804 may be used to perform S204.

In some embodiments, as shown in FIG. 14, the data processing apparatus further includes a sorting module 805 used to sort the influence degrees of pieces of acquired process information on the sudden defect. The display module 804 is used to display the influence degrees of the pieces of process information on the sudden defect after being sorted on the analysis result display interface.

For example, referring to FIG. 3, the receiving functions of the receiving module 801 and the acquisition module 802 described above may be implemented by the interface unit 304 in FIG. 3. The processing function of the acquisition module 802, the determination module 803, and the sorting module 805 may be implemented by the processor 301 in FIG. 3 calling the computer program stored in the memory 302. The display module 804 may be implemented by the display 306 in FIG. 3.

As for specific descriptions of the foregoing optional manners, reference may be made to the description of the foregoing method embodiments, and details will not be repeated here. In addition, as for the explanation of the data processing apparatus 80 and the description of the beneficial effects of the data processing apparatus 80 in any application example provided above, reference may be made to the corresponding method embodiments described above, and details will not be repeated here.

It will be noted that, operations correspondingly performed by the above modules are only specific examples, and as for the operations actually performed by various modules, reference may be made to the operations or steps in the above description of the embodiments based on FIG. 9.

Some embodiments of the present disclosure further provide an electronic device. The electronic device includes a processor and a memory used for storing instructions executable on the processor. The processor is configured to execute the instructions to implement the data processing method as described in any of the above embodiments.

Some embodiments of the present disclosure provide a computer-readable storage medium (e.g., a non-transitory computer-readable storage medium). The computer-readable storage medium has stored thereon computer program instructions that, when run on a processor, cause the processor to perform one or more steps of the data processing method as described in any of the above embodiments.

For example, the computer-readable storage medium includes but is not limited to, a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM)), a card, a stick or a key driver. Various computer-readable storage media described in the present disclosure may refer to one or more devices for storing information and/or other machine-readable storage medium. The term "machine-readable storage medium" may include, but is not limited to, wireless channels and other various media capable of storing, containing and/or carrying instructions and/or data.

Some embodiments of the present disclosure further provide a computer program product. The computer program product includes computer program instructions that, when executed by a computer, cause the computer to perform one or more steps of the data processing method as described in the above embodiments.

Some embodiments of the present disclosure further provide a computer program. When the computer program is executed by a computer, the computer program causes the computer to perform one or more steps of the data processing method as described in the above embodiments.

Beneficial effects of the computer-readable storage medium, the computer program product and the computer program are the same as the beneficial effects of the data processing method as described in the above embodiments, which will not be repeated here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A data processing method applied to a data processing system, the data processing system including a data processing apparatus, a display apparatus and a distributed storage apparatus, the method comprising:

acquiring, by the data processing apparatus, a production record corresponding to each sample of a plurality of samples, wherein the production record includes process information, a production time corresponding to the process information, and an index value; the process information includes at least one of a process parameter or a process step; the index value is used to represent a defect degree of the sample with regard to a preset defect type; the plurality of samples includes defective samples, and index values of the defective samples are greater than a first threshold value;

determining, by the data processing apparatus, a high-incidence time period of defects according to index values and production times corresponding to the process information in acquired production records of the plurality of samples, wherein the high-incidence time period of defects is a time period in which a distribution probability of defective samples is greater than a second threshold value; and determining, by the data processing apparatus, an influence degree of the process information on a sudden defect according to the high-incidence time period of defects and the acquired production records;

sorting, by the data processing apparatus, influence degrees of pieces of acquired process information on the sudden defect; and displaying, by the display apparatus, the influence degrees of the pieces of process information on the sudden defect after being sorted, so as to adjust at least one of process parameters or process steps that cause the sudden defect.

2. The data processing method according to claim 1, wherein in a case where the process information is the process step, determining the influence degree of the process information on the sudden defect according to the high-incidence time period of defects and the acquired production records includes:

determining a target distribution of index values of samples in the high-incidence time period of defects on the production times corresponding to the process step in the acquired production records;

determining a difference value between the target distribution and a preset distribution, the difference value being used to represent a distribution probability of defective samples passing through the process step; and determining the influence degree of the process step on the sudden defect according to the difference value.

3. The data processing method according to claim 2, wherein determining the target distribution of the index values of the samples in the high-incidence time period of defects on the production times corresponding to the process step includes:

converting the production times corresponding to the process step into time numerical values corresponding to the process step; and determining the target distribution of the index values of the samples in the high-incidence time period of defects on the time numerical values corresponding to the process step.

4. The data processing method according to claim 3, wherein determining the target distribution of the index values of the samples in the high-incidence time period of defects on the time numerical values corresponding to the process step includes:

fitting the time numerical values corresponding to the process step into fitting index values by using a polynomial curve fitting method; and determining a distribution of the fitting index values on the time numerical values as the target distribution of the index values of the samples in the high-incidence time period of defects on the time numerical values corresponding to the process step.

5. The data processing method according to claim 2, wherein the preset distribution is a standard normal distribution; the target distribution is a polynomial distribution; determining the difference value between the target distribution and the preset distribution includes:

obtaining the difference value between the target distribution and the standard normal distribution by using a significance test.

6. The data processing method according to claim 1, wherein determining the high-incidence time period of defects according to the index values and the production times corresponding to the process information in the acquired production records includes:

dividing the plurality of samples into non-defective samples and the defective samples according to the first threshold value and the index values in the acquired production records; and determining a time period, during which a ratio of a number of defective samples to a total number of the plurality of samples is greater than the second threshold value, in the acquired production records as the high-incidence time period of defects.

7. The data processing method according to claim 1, wherein in a case where the process information is the process parameter, determining the influence degree of the process information on the sudden defect according to the high-incidence time period of defects and the acquired production records includes:

obtaining a first production time by using an abrupt change point detection, the first production time being an abrupt change time point of the index values in the acquired production records, and the first production time being a time point in the high-incidence time period of defects;

obtaining a critical change point of the process parameter in the production records;

determining a time corresponding to the critical change point as a second production time;

determining a difference value between the first production time and the second production time; and determining an influence degree of the process parameter on the sudden defect according to the difference value.

8. The data processing method according to claim 7, wherein obtaining the critical change point of the process parameter in the production records includes:

obtaining Gini coefficients of values of the process parameter in the production records; and determining a value of the process parameter with a smallest Gini coefficient as the critical change point of the process parameter.

9. The data processing method according to claim 1, further comprising:

obtaining a Gini coefficient of the process information in the production records, the Gini coefficient of the process information being used to represent a correlation degree between the process information and the index values of the plurality of samples; and determining the influence degree of the process information on the sudden defect according to the Gini coefficient of the process information.

10. The data processing method according to claim 9, wherein in a case where the process information is the process step, the data processing method further comprises:

performing a chi-square test on the process step in the production records to obtain a chi-square test value of the process step to the index values of the plurality of samples, the chi-square test value being used to represent an influence degree of the process step on the index values of the plurality of samples; and determining the influence degree of the process information on the sudden defect according to the Gini coefficient of the process information includes:

determining the influence degree of the process step on the sudden defect according to first preset weights of the chi-square test value and the Gini coefficient of the process step, the chi-square test value, and the Gini coefficient of the process step.

11. The data processing method according to claim 9, wherein in a case where the process information is the process parameter, the data processing method further comprises:

performing a correlation test on the process parameter and the index values of the plurality of samples in the production records to obtain an influence parameter of the process parameter, the influence parameter being used to represent an influence degree of the process parameter on the index values of the plurality of samples; and determining the influence degree of the process information on the sudden defect according to the Gini coefficient of the process information includes:

obtaining the influence degree of the process parameter on the sudden defect according to second preset weights of the influence parameter and the Gini coefficient of the process parameter, the influence parameter and the Gini coefficient of the process parameter.

12. The data processing method according to claim 1, wherein acquiring the production record corresponding to each sample of the plurality of samples includes:

obtaining a first corresponding relationship between a sample identification and the index value of each sample of the plurality of samples, and a second corresponding relationship between the sample identification, the process information, and the production time corresponding to the process information of each sample; and establishing a third corresponding relationship between the process information, the production time corresponding to the process information, and the index value of each sample according to the sample identification of each sample, the first corresponding relationship, and the second corresponding relationship.

13. An electronic device, comprising:

a processor, and a memory used to store instructions executable on the processor;

wherein the processor is configured to execute the instructions to implement the data processing method according to claim 1.

14. A non-transitory computer-readable storage medium, having stored thereon computer program instructions that, when run on a processor, cause the processor to perform the data processing method according to claim 1.

15. A computer program product, comprising computer program instructions stored on a non-transitory computer-readable storage medium, wherein when executed by a computer, the computer program instructions cause the computer to perform the data processing method according to claim 1.

16. A data processing method applied to a data processing system, the data processing system including a data processing apparatus, a display apparatus and a distributed storage apparatus, the method comprising:

receiving, by the data processing apparatus, a sample screening condition of an input of a user on a condition selection interface;

acquiring, by the data processing apparatus, a production record of each sample of a plurality of samples corresponding to the sample screening condition, wherein the production record includes process information, a production time corresponding to the process information, and an index value; the process information includes at least one of a process parameter or a process step; the index value is used to represent a defect degree of the sample with regard to a preset defect type; the plurality of samples includes defective samples, and index values of the defective samples are greater than a first threshold value;

determining, by the data processing apparatus, a high-incidence time period of defects according to index values and production times corresponding to the process information in acquired production records of the plurality of samples, the high-incidence time period of defects being a time period in which a distribution probability of defective samples is greater than a second threshold value; and determining, by the data processing apparatus, an influence degree of the process information on a sudden defect according to the high-incidence time period of defects and the acquired production records;

sorting, by the data processing apparatus, influence degrees of pieces of acquired process information on the sudden defect; and displaying, by the display apparatus, the influence degrees of the pieces of process information on the sudden defect after being sorted on the analysis result display interface, so as to adjust at least one of process parameters or process steps that cause the sudden defect.

17. An electronic device, comprising:

a processor; and a memory used to store instructions executable on the processor;

wherein the processor is configured to execute the instructions to implement the data processing method according to claim 16.

18. A non-transitory computer-readable storage medium, having stored thereon computer program instructions that, when run on a processor, cause the processor to perform the data processing method according to claim 16.

19. A computer program product, comprising computer program instructions stored on a non-transitory computer-readable storage medium, wherein when executed by a computer, the computer program instructions cause the computer to perform the data processing method according to claim 16.

\* \* \* \* \*